(12) United States Patent
Iwasaki

(10) Patent No.: US 7,695,182 B2
(45) Date of Patent: Apr. 13, 2010

(54) PLANAR LIGHTING DEVICE

(75) Inventor: Osamu Iwasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/248,571

(22) Filed: Oct. 9, 2008

(65) Prior Publication Data
US 2009/0097277 A1 Apr. 16, 2009

(30) Foreign Application Priority Data
Oct. 10, 2007 (JP) .............................. 2007-264109

(51) Int. Cl.
*F21V 7/04* (2006.01)
(52) U.S. Cl. ...................... 362/633; 362/634; 362/628
(58) Field of Classification Search .......... 362/632–634
See application file for complete search history.

(56) References Cited
U.S. PATENT DOCUMENTS

| 5,993,020 | A | 11/1999 | Koike |
| 6,217,184 | B1 | 4/2001 | Koike et al. |
| 7,052,168 | B2 * | 5/2006 | Epstein et al. ............... 362/625 |
| 7,364,343 | B2 * | 4/2008 | Keuper et al. ............... 362/628 |
| 7,401,926 | B2 * | 7/2008 | Kamijima et al. ............ 353/31 |
| 7,490,969 | B2 * | 2/2009 | Sun et al. .................... 362/612 |
| 7,572,045 | B2 * | 8/2009 | Hoelen et al. ............... 362/628 |
| 7,604,387 | B2 * | 10/2009 | Liu ............................ 362/606 |

FOREIGN PATENT DOCUMENTS

| JP | 07-36037 A | 2/1995 |
| JP | 08-248233 A | 9/1996 |
| JP | 08-271739 A | 10/1996 |
| JP | 11-153963 A | 6/1999 |

* cited by examiner

*Primary Examiner*—Anabel M Ton
(74) *Attorney, Agent, or Firm*—Sughrue Mion, PLLC

(57) ABSTRACT

A planar lighting device is capable of keeping the light entrance plane of the light guide plate spaced a constant distance from the light source and the light guide plate spaced a constant distance from the liquid crystal display panel even when the light guide plate expands, contracts or warps. This prevents break of the light source, decrease of light admission efficiency, occurrence of uneven brightness, and break of the liquid crystal display panel and permits a thin, larger, and lightweight design. The planar lighting device includes a fixing member for keeping them spaced from each other, a housing for accommodating the light source and the light guide plate, a sliding mechanism to elastically hold the fixing means against the housing while keeping the light source spaced a constant distance from the light guide plate, and a reinforcing member for reinforcing the housing.

14 Claims, 16 Drawing Sheets

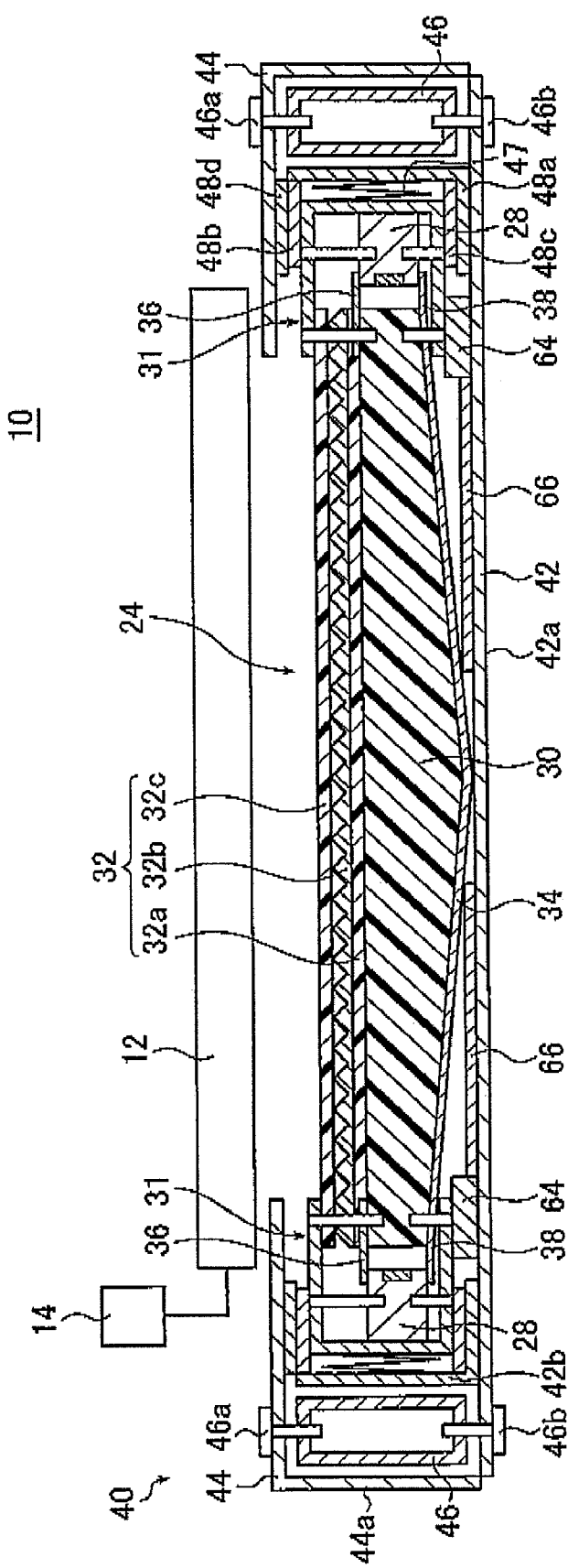

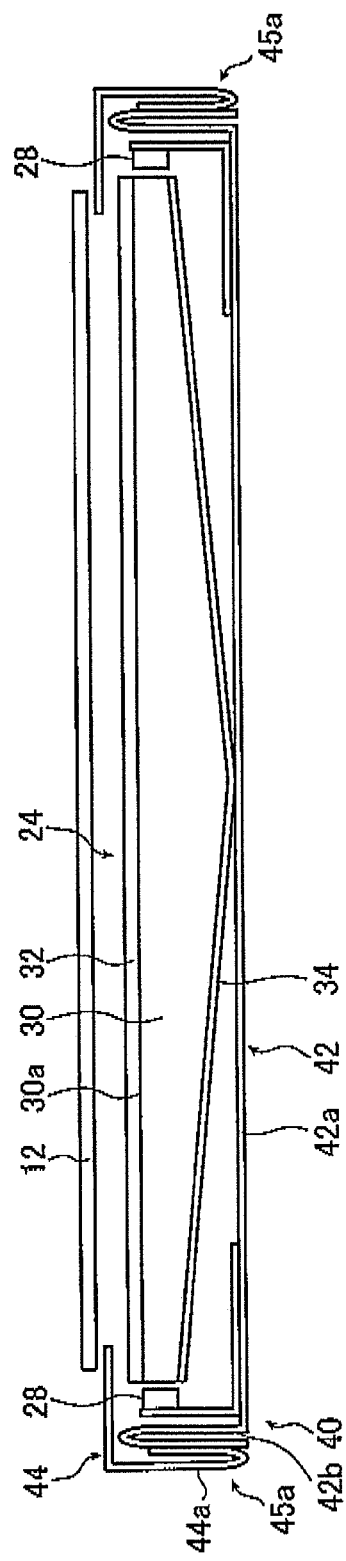
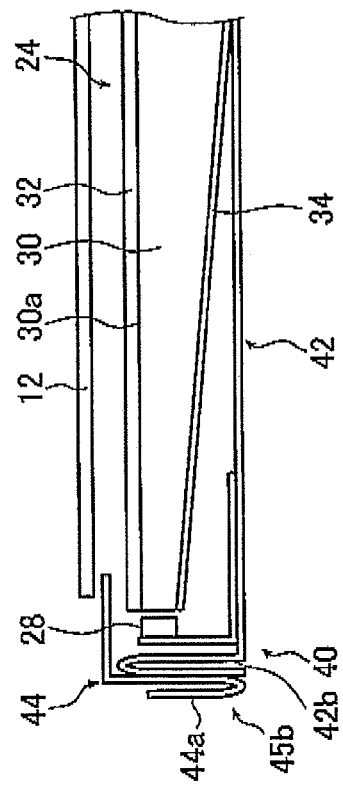

NON-FOLDED STRUCTURE

SINGLE-FOLDED STRUCTURE

DOUBLE-FOLDED STRUCTURE

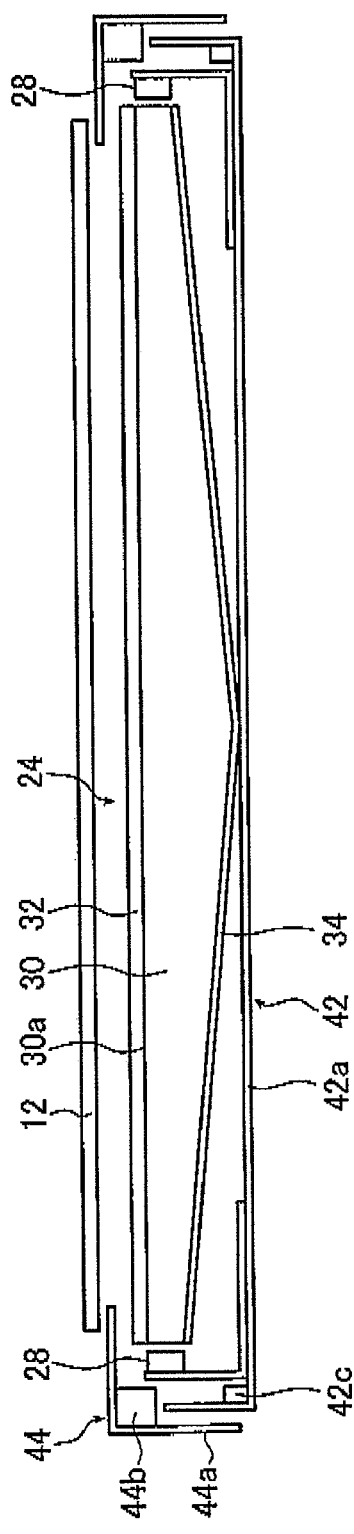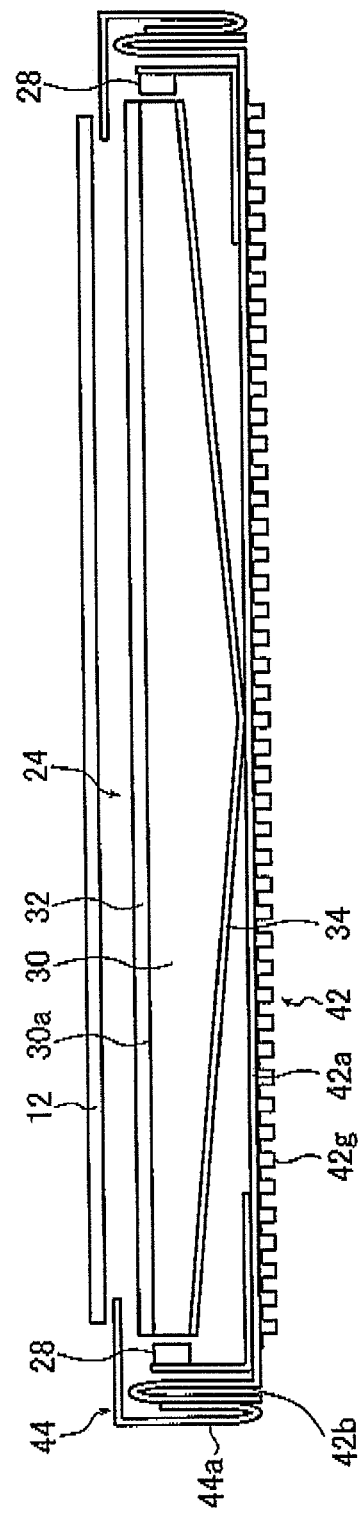

PLANAR LIGHTING DEVICE

BACKGROUND OF THE INVENTION

The present invention relates to a planar lighting device including light sources and a light guide plate for admitting light emitted by the light sources and emitting a light through the light exit plane thereof. The inventive planar lighting device is used for indoor and outdoor illumination or as a backlight to illuminate the liquid crystal display panel used in liquid crystal display devices or a backlight used for advertising panels, advertising towers, advertising signs, and the like.

Liquid crystal display devices use a backlight unit for radiating light from behind the liquid crystal display panel to illuminate the liquid crystal display panel. A backlight unit is configured using optical members including a light guide plate for admitting light emitted by an illuminating light source and diffusing the light within the inside thereof to emit the light through a light exit plane, irradiating the liquid crystal display panel, a prism sheet, and a diffusion sheet.

Currently, large liquid crystal display televisions predominantly use a so-called direct illumination type backlight unit having no light guide plate but including optical members such as a diffusion plate disposed immediately above the illuminating light source. This type of planar lighting device includes cold cathode tubes serving as a light source provided on the rear side of the liquid crystal display panel whereas the inside of the backlight unit provides white reflection surfaces to secure uniform light amount distribution and a necessary brightness.

To achieve uniform light amount distribution with the direct illumination type backlight unit, however, the backlight unit needs to have a given thickness, say about 30 mm, in a direction perpendicular to the liquid crystal display panel. While demands of still thinner backlight units are expected to grow in the future, achieving a further reduced thickness of say 10 mm or less with a backlight unit is deemed difficult in view of uneven light amount distribution expected to accompany the direct illumination type.

Among backlight units that allow reduction of thickness thereof is a backlight unit using a light guide plate for admitting light emitted by light sources from its side face to diffuse it, and emitting the light through a light exit plane positioned on a front side different from the plane through which the light has been admitted.

There has been proposed a backlight of a type described above using a light guide plate formed of a material prepared by mixing scattering particles for scattering light into a transparent resin, for which reference may be had, for example, to JP 07-36037 A, JP 08-248233 A, JP 08-271739 A, and JP 11-153963 A.

JP 07-36037 A, discloses a light diffusion light guide light source device including a light diffusion light guide member having at least one light entrance plane region, and at least one light exit plane region and light source means for admitting light through the light entrance plane region, the light diffusion light guide member having a region that has a tendency to decrease in thickness with the increasing distance from the light entrance plane.

JP 08-248233 A discloses a planar light source device including a light diffusion light guide member, light source means for supplying light through at least one side of the light diffusion light guide member, a prism sheet provided on the side of the light diffusion light guide member closer to a light exit plane, and a reflector provided on the rear side of the light diffusion light guide member. JP 08-271739 A discloses a liquid crystal display including a light emission direction correcting element formed of sheet optical materials provided with a light entrance plane having a repeated undulate pattern of prism arrays and a light exit plane given light diffusing properties. JP 11-153963 A discloses a light source device including a light diffusion light guide member having a scattering power therein and light supply means for supplying light through an end plane of the light diffusion light guide member.

In the planar lighting devices provided with a light diffusion light guide plate containing light scatterers mixed therein as disclosed in the above prior art literature, light emitted by the light source and admitted through the light entrance plane into the light diffusion light guide member receives scattering effects of the light scattering particles to be scattered as the light propagates through the inside of the light diffusion light guide member. However, only a portion of the scattered light having a predetermined angle or more to the light exit plane of the diffusion light guide member is emitted from the light exit plane, while portions of the scattered light having a predetermined angle or less and the light directed to the reflector of the rear side are fully reflected, and a significant proportion of the light that has reached is returned back into the diffusion light guide member.

The above composite process produces light that propagates with a directivity to travel obliquely forward as viewed from the light source, and is highly efficiently emitted as almost uniformly bright light through the full light exit plane. Briefly, light radiated by the light source can be extracted as almost uniformly bright light through the light exit plane of the light diffusion light guide member.

Thus, the prior art literature described above purportedly states that a light guide plate containing light scattering particles mixed therein is capable of emitting uniform light with a high light emission efficiency.

As regards the light guide plate used in the planar lighting device, there have been disclosed a light guide plate in the form of a flat plate, and a light guide plate composed of a portion shaped to have a region with a tendency to grow thinner with the increasing distance from the light entrance plane attached to the other portion, in addition to the light guide plate described above that is shaped to have a region with a tendency to grow thinner with the increasing distance from the light entrance plane.

However, in the planar lighting device using any of the light guide plates disclosed in the above prior art literature, the light guide plate is expanded/contracted or warped due to effects of temperature and humidity. The expansion/contraction or the warp of the light guide plate occurs to a greater extent as its size increases. Thus, the effect of expansion/contraction of the light guide plate becomes conspicuous when the planar lighting device using the light guide plate has greater dimensions.

Thus, when the light guide plate is expanded/contracted, if the light guide plate and the light source such as a light emitting diode (LED) disposed adjacent to its light entrance plane are fixed to different support members such as housings, during expansion of the light guide plate, the expanded light guide plate presses the adjacent light source such as an LED to destroy it.

When the light guide plate is contracted, a distance between the light entrance plane of the light guide plate and the light source such as an LED is increased to lower efficiency of admitting the light emitted from the light source into the light entrance plane of the light guide plate, thus causing a problem of a reduction in use efficiency of the light emitted from the light source.

When the light guide plate is warped, a distance from the liquid crystal display panel illuminated by the planar lighting device is partially changed to disable uniform illumination, resulting in uneven brightness. Moreover, when the warp is enlarged, the light guide plate comes into contact with the liquid crystal display panel to destroy it.

In the planar lighting device disclosed in the prior art literature, no consideration is given to the problems caused by the expansion/contraction or the warp of the light guide plate. Thus, it is impossible to solve the problems.

SUMMARY OF THE INVENTION

Thus, an object of the present invention is to provide a planar lighting device that eliminates the problems accompanying the above prior art, maintains constant a distance between a light entrance plane of a light guide plate and a light source such as an LED and a distance between the light guide plate and a liquid crystal display panel even when the light guide plate is expanded/contracted or warped, prevents destruction of the light source, a reduction in admitting efficiency, uneven brightness of light emitted from a light exit plane of the light guide plate, and destruction of the liquid crystal display panel, and that is made thinner, made lighter in weight, and increased in dimensions.

To solve the above problems, the present invention provides a planar lighting device including: a light source for emitting light; a light guide plate disposed adjacent to the light source and including a light entrance plane for admitting the light emitted by the light source and a light exit plane for emitting the light admitted from the light entrance plane as planar light; fixing means for fixing and integrating the light source and the light guide plate while keeping constant a distance between the light source and the light entrance plane of the light guide plate; a housing for housing the light source and the light guide plate integrated by the fixing means; a sliding mechanism disposed between the housing and the fixing means to integrate the light source and the light guide plate in a direction from the light entrance plane of the light guide plate to the light source according to expansion/contraction of the light guide plate and to elastically hold the fixing means with respect to the housing while keeping constant the distance between the light source and the light entrance plane of the light guide plate; and a reinforcing member for reinforcing the housing according to the expansion/contraction of the light guide plate.

Preferably, the fixing means integrates the light guide plate to be slidable with respect to the fixing means in a direction orthogonal to the direction from the light entrance plane of the light guide plate to the light source according to the expansion/contraction of the light guide plate.

Preferably, the sliding mechanism can change a frictional force between the sliding mechanism and the fixing means according to the expansion/contraction of the light guide plate.

Preferably, the sliding mechanism includes a sliding member for holding the fixing means by stress of screwing the housing, and a frictional force $T(x)$ between the sliding member and the fixing means in a position away by a distance x from the screwing position is represented by the following equation:

$$T(x) = \mu \cdot G(x)$$

where $\mu$ is a coefficient of static friction between the sliding member and the fixing means, and $G(x)$ is a stress distribution of the screwing in the position away by the distance x from the screwing position, and when a force F of the expansion/contraction of the light guide plate is represented by the following equation:

$$F = Y \cdot Aave \cdot (\Delta L/L)$$

where Y is Young's modulus of the light guide plate, Aave is an average sectional area of the light guide plate, L is a length of the light guide plate, and $\Delta L$ is an expanded/contracted length of the light guide plate, the sliding member is disposed from a position of screwing the housing to a position x which satisfies the following equation:

$$T(x) = \mu \cdot G(x) < F = Y \cdot Aave \cdot (\Delta L/L)$$

Preferably, a linear expansion coefficient of the light guide plate satisfies $1/1000 < \Delta L/L < 5/1000$, and Young's modulus thereof satisfies $1.5 \text{ MN/m}^2 < Y < 3 \text{ MN/m}^2$.

Preferably, the light guide plate includes the light exit plane that is rectangular and flat, a pair of the opposite light entrance planes formed along a pair of opposite sides of the light exit plane to admit light travelling parallel to the light exit plane, and a rear plane having a pair of inclined planes formed on the side opposite from the light exit plane and inclined such that the thickness of the light guide plate in the direction perpendicular to the light exit plane grows thicker with an increasing distance from each of the pair of light entrance planes and joining each other in a middle between the pair of light entrance planes. The light source includes a pair of light sources disposed opposite the pair of light entrance planes of the light guide plate to emit light to each of the pair of light entrance planes. Each of the pair of light sources has a plurality of LED chips and a support for supporting the plurality of LED chips. The plurality of LED chips are arrayed on a plane of the support facing each of the pair of light entrance planes in the longitudinal direction of each of the pair of light entrance planes.

Preferably, the planar lighting device further includes a pair of remaining light entrance planes formed on a pair of remaining opposite sides of the light exit plane of the light guide plate to be orthogonal to the pair of light entrance planes, and a pair of the light sources disposed opposite each of the pair of remaining light entrance planes to emit light to each of the pair of remaining light entrance planes.

Preferably, each of the plurality of LED chips satisfies an inequality b<a, where a is a length of the light guide plate in a thickness direction, and b is a length of the light guide plate in a direction perpendicular to the thickness direction.

Preferably, the light guide plate includes numerous scattering particles therein, and satisfies the following inequalities:

$$1.1 \leq \Phi \cdot N_p \cdot L_G \cdot K_c \leq 8.2$$

$$0.005 \leq K_c \leq 0.1$$

where $\Phi$ is a scattering sectional area of the scattering particles, $N_p$ is a density of the scattering particles, $K_c$ is a correction coefficient, and $L_G$ is a length from the light entrance plane of the light guide plate to a position where a thickness of the light guide plate is largest in a light entrance direction.

Preferably, the reinforcing member has a structure where an edge of the housing is bent to be folded back. A bending curvature radius R in the structure where the edge of the housing is bent to be folded back is within a range of 0.3 mm<R<1 mm, and a plate thickness T of the housing is within a range of 0.5 mm<T<1.5 mm.

Preferably, the reinforcing member has a structure where a rib is provided in the housing. A relation among a width W and a height H of the rib and a thickness T of the housing in the structure where the rib is provided in the housing is W<H<T, and the thickness T of the housing is within a range of 5 mm<T<20 mm.

Preferably, the reinforcing member has a structure where a block is disposed at the edge of the housing. A longer-side size A and a shorter-side size B of the block and the thickness T of the housing in the structure where the block is disposed at the edge of the housing are respectively within ranges of 0.2T<A<0.5 T and 0.2 T<B<0.5 T.

Preferably, the reinforcing member has a honeycomb structure disposed in a lower housing of the housing. A plate thickness Th of the honeycomb structure disposed in the lower housing of the housing is within a range of 0.5 mm<Th<1.5 mm, and a size of a diagonal line Wh of the honeycomb structure is within a range of 5 mm<Wh<20 mm.

Preferably, the reinforcing member has a structure where an edge of the housing is bent to be folded back. A bending curvature radius R in the structure where the edge of the housing is bent to be folded back is within a range of 0.3 mm<R<1 mm, and a plate thickness T of the housing is within a range of 0.5 mm<T<1.5 mm.

Preferably, the reinforcing member has a structure where a rib is provided in the housing. A relation among a width W and a height H of the rib and a thickness T of the housing in the structure where the rib is provided in the housing is W<H<T, and the thickness T of the housing is within a range of 5 mm<T<20 mm.

Preferably, the reinforcing member has a structure where a block is disposed at the edge of the housing. A longer-side size A and a shorter-side size B of the block and the thickness T of the housing in the structure where the block is disposed at the edge of the housing are respectively within ranges of 0.2 T<A<0.5 T and 0.2 T<B<0.5 T.

Preferably, the reinforcing member has a honeycomb structure disposed in a lower housing of the housing. A plate thickness Th of the honeycomb structure disposed in the lower housing of the housing is within a range of 0.5 mm<Th<1.5 mm, and a size of a diagonal line Wh of the honeycomb structure is within a range of 5 mm<Wh<20 mm.

According to the present invention, with the above configuration, especially integration and fixing of the light source such as an LED and the light guide plate, the distance between the light entrance plane of the light guide plate and the light source, in other words, an optical axis distance and an optical axis perpendicular distance between the light source and the light guide plate are kept constant. Thus, expansion/contraction of the light guide plate can be prevented from destroying the light source and reducing efficiency of admitting light from the light source into the light guide plate. According to the present invention, free expansion/contraction of the light guide plate in the housing prevents a warp of the light guide plate. Thus, uneven brightness of light emitted from the light exit plane of the light guide plate can be prevented. Even when the planar lighting device is used as a backlight of a liquid crystal display device, the light guide plate is prevented from pushing a liquid crystal panel, causing no uneven display or uneven brightness on the display screen. According to the present invention, effects of expansion/contraction of the light guide plate can be prevented even when a large light guide plate is used. Thus, the planar lighting device can be increased in dimensions to be applied to a large liquid crystal display device.

Furthermore, according to the present invention, the reinforcing member for reinforcing the housing is provided corresponding to expansion/contraction of the light guide plate.

Thus, the expansion/contraction or a warp of the light guide plate can be prevented from deforming the housing.

BRIEF DESCRIPTION OF THE DRAWINGS

In the accompanying drawings:

FIG. 2 is a schematic cross sectional view of the liquid crystal display device illustrated in FIG. 1 taken along line A-A;

FIGS. 3A and 3B are views of modified examples of the liquid crystal display device illustrated in FIG. 2;

FIGS. 13A and 13B are cross sectional views respectively illustrating examples of reinforcing members employing a structure where a block is disposed at an edge of a housing, and a honeycomb structure disposed in a lower housing of the housing;

DETAILED DESCRIPTION OF THE PREFERRED EMBODIMENT

A preferred embodiment of a planar lighting device of the present invention will be described in detail below referring to the accompanying drawings.

A planar lighting device of a 2-side entrance type for admitting light from a light source to two sides of a light guide plate will be described below as a representative example. Needless to say, however, the present invention is not limited to this example.

Figure 1:
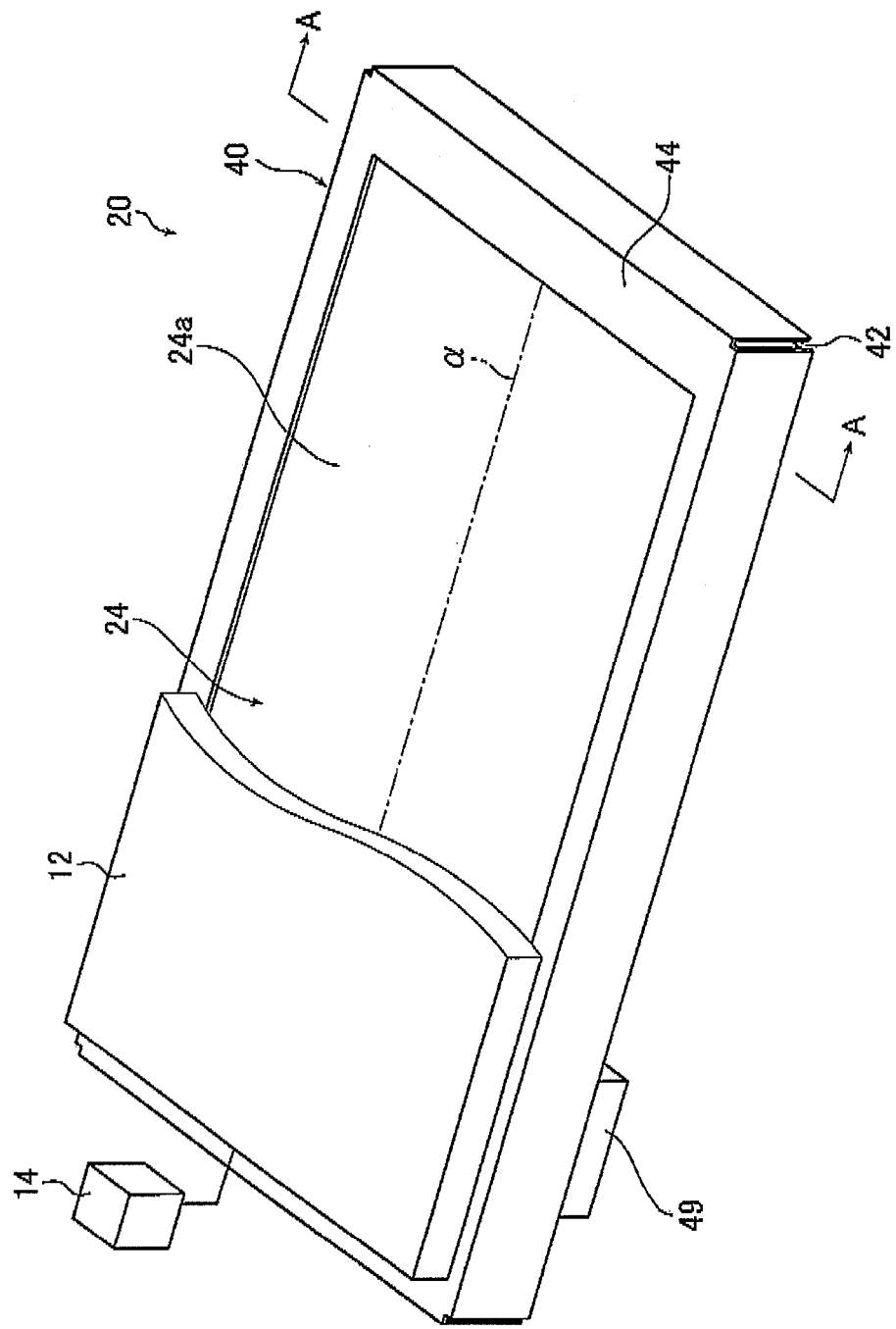
FIG. 1 is a schematic perspective view illustrating an embodiment of a liquid crystal display device using a planar lighting device of the present invention.
Figure 4:
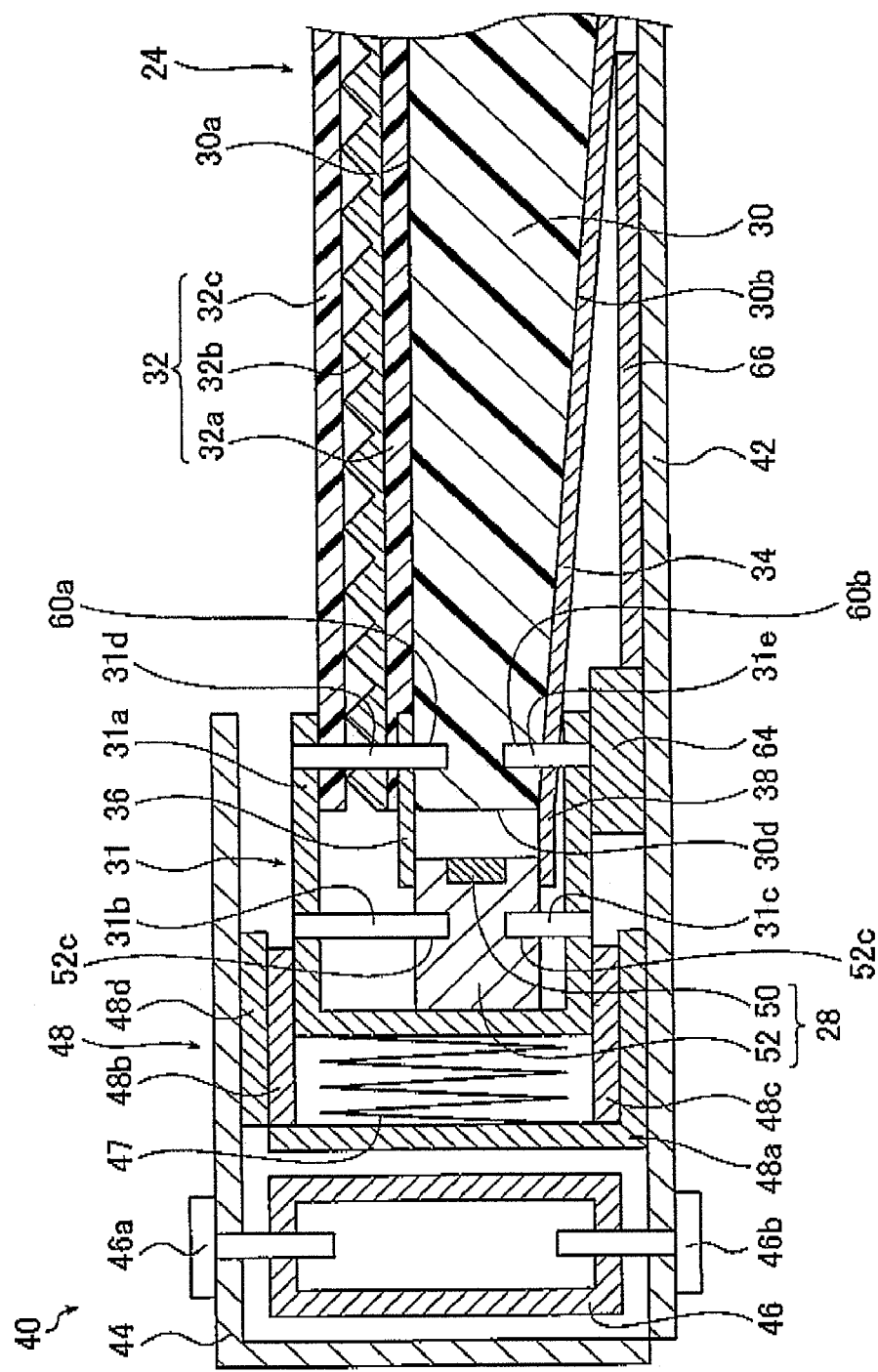
FIG. 4 is a partially enlarged cross sectional view of the vicinity of a light source and a light entrance plane of a light guide plate of the planar lighting device of the liquid crystal display device illustrated in FIG. 2.
Figure 5A:
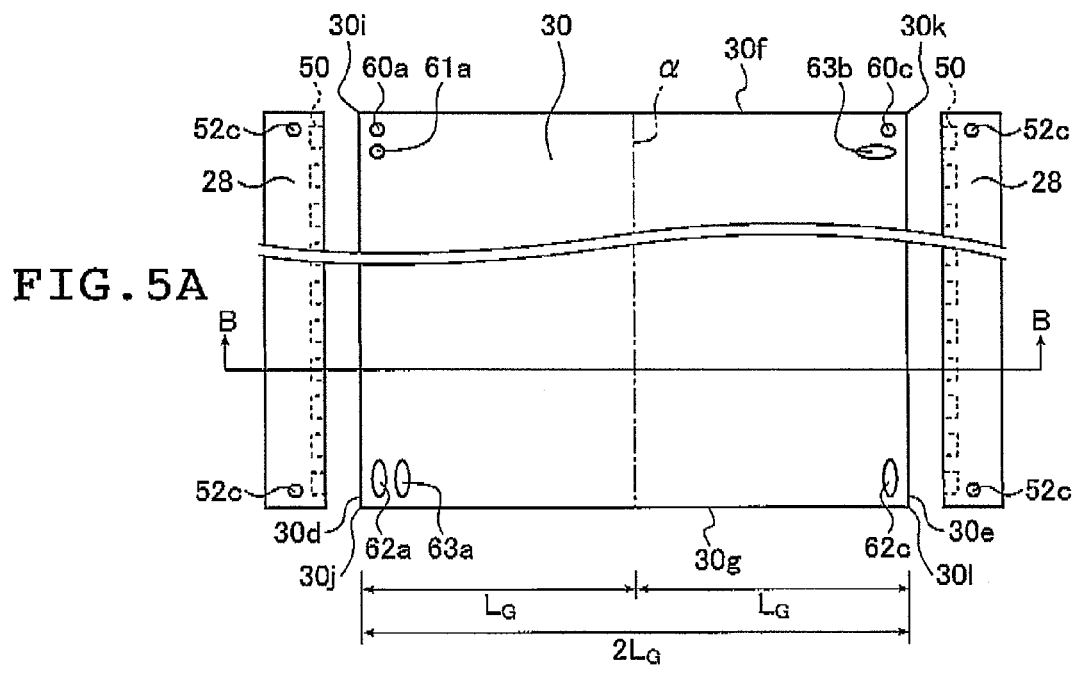
FIG. 5A is a partially omitted plan view of the light source and the light guide plate of the planar lighting device illustrated in FIG. 2.
Figure 5B:
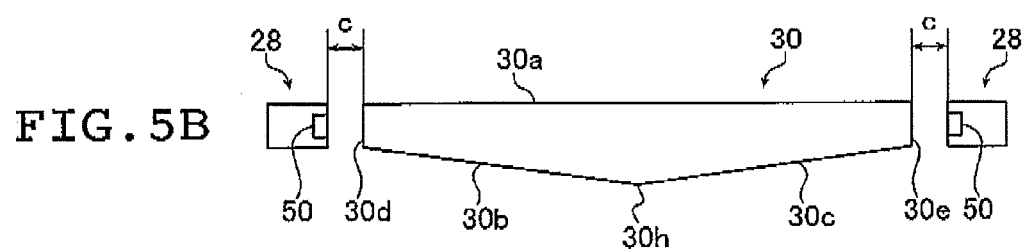
FIG. 5B is a cross sectional view taken along line B-B of FIG. 5A.

FIG. 1 is a schematic perspective view illustrating a liquid crystal display device provided with the planar lighting device of the present invention. FIG. 2 is a cross sectional view of the liquid crystal display device illustrated in FIG. 1 taken along line A-A. FIGS. 3A and 3B are views of modified examples of the liquid crystal display device illustrated in FIG. 2. FIG. 4 is a partially enlarged cross sectional view illustrating in detail a light guide plate illustrated in FIG. 2. FIG. 5A is a partially omitted plan view of the light guide plate and light sources disposed in its two sides of the planar lighting device (also referred to as "backlight unit" below) illustrated in FIGS. 2 and 5B is a cross sectional view of FIG. 5A taken along line B-B.

As illustrated in FIG. 1, a liquid crystal display device 10 includes a backlight unit 20, a liquid crystal display panel 12 disposed on the side of the backlight unit 20 closer to a light exit plane, and a drive unit 14 for driving the liquid crystal display panel 12. In FIG. 1, part of the liquid crystal display panel 12 is not shown to better illustrate the configuration of the backlight unit 20.

In the liquid crystal display panel 12, a voltage is partially applied to transparent electrodes of liquid crystal cells having liquid crystal molecules, previously arranged in a given direction, to change the orientation of the molecules. The resultant changes in refractive index in the liquid crystal cells are used to display characters, figures, images, etc., on the liquid crystal display panel 12.

The drive unit 14 selectively applies a voltage to the transparent electrodes of the liquid crystal cells in the liquid crystal display panel 12 to change the orientation of the liquid crystal molecules, thereby controlling the transmittance of the light transmitted through the liquid crystal display panel 12.

The backlight unit 20 includes a main body of the lighting device 24 for illuminating the whole surface of the liquid crystal display panel 12 from behind the liquid crystal display panel 12. The main body of the lighting device 24 includes a light exit plane 24a having substantially a same shape as an image display surface of the liquid crystal display panel 12.

As illustrated in FIGS. 2, 3A and 3B, 4, and 5A and 5B, the backlight unit 20 of the present invention includes the main body of the lighting device 24 and a housing 40. The main body of the lighting device 24 includes two light sources 28, a light guide plate 30, fixing means 31 (see FIG. 4), an optical member unit 32, and a reflection plate 34. The housing 40 includes a lower housing 42, an upper housing 44, a reinforcing member 46, and a sliding mechanism 48 (see FIG. 4). Modified examples of the liquid crystal display device 10 illustrated in FIGS. 3A and 3B are different from the example illustrated in FIG. 2 in structure and configuration of the lower housing 42, the upper housing 44 and the reinforcing member 46 of the housing 40. Thus, in the illustrated example, the fixing means 31 of the main body of the lighting device 24, and the sliding mechanism 48 of the housing 40 are not shown, but only a simplified state is illustrated.

In the example illustrated in FIG. 4, a heat sink 64 and a heat pipe 66 are disposed between the reflection plate 34 and the lower housing 42. As illustrated in FIG. 1, a power unit casing 49 is provided on the underside of the lower housing 42 of the housing 40 to hold power supply units that supply the light sources 28 with electrical power.

Now, mainly referring to FIG. 4, components that make up the backlight unit 20 will be described.

The main body of the lighting device 24 includes the light sources 28 for emitting light, a light guide plate 30 for emitting the light emitted by the light sources 28 to produce planar light from a light exit plane 30a, fixing means 31 for fixing the light guide plate 30 and the light sources 28 by keeping constant an optical axis distance and an optical axis perpendicular distance therebetween, an optical member unit 32 for scattering and diffusing the light emitted from the light exit plane 30a of the light guide plate 30 to obtain light with further reduced unevenness, and a reflection plate 34 for reflecting light leaked from the light guide plate 30 to admit the light again to the light guide plate 30.

As illustrated in FIG. 5B, the optical axis distance between the light guide plate 30 and the light source 28 is a distance c between a light exit plane of the light source 28 and a light entrance plane (30d or 30e) of the light guide plate 30. The optical axis perpendicular distance between the light guide plate 30 and the light source 28 is a distance between optical axes of the light guide plate 30 and the light source 28 in a thickness direction of the light guide plate.

First, referring to FIG. 4, the fixing means 31 and the sliding mechanism 48 which are feature components of the present invention will be described briefly. The fixing means 31 integrally fixes the light source 28, the light guide plate 30, the optical member unit 32, and the reflection plate 34 with a fixing member 31a, screws 31b and 31c, and fixing pins 31d and 31e to keep constant the optical axis distance and the optical axis perpendicular distance between the light source 28 and the light guide plate 30. The sliding mechanism 48 includes a spring member 47, sliding member fixing members 48a and 48d, and an upper sliding member 48b and a lower sliding member 48c, and supports the fixing member 31a for integrally fixing the light source 28 and the light guide plate 30 to be slidable in the housing 40 according to expansion/contraction of the light guide plate 30.

Next, the light sources 28 will be described.

Figure 6A:
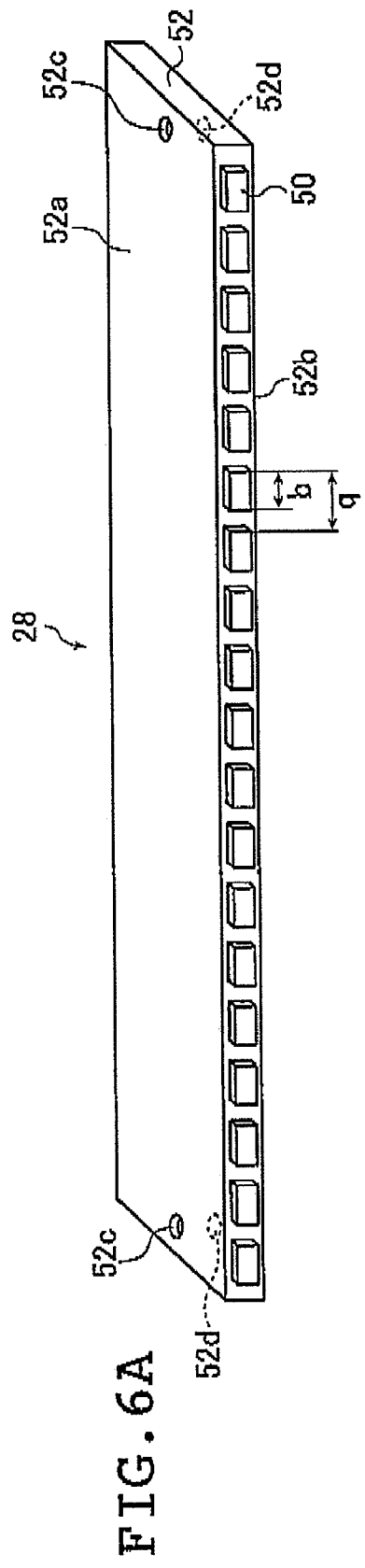
FIG. 6A is a perspective view illustrating a schematic configuration of the light source of the planar lighting device illustrated in FIG. 2.
Figure 6C:
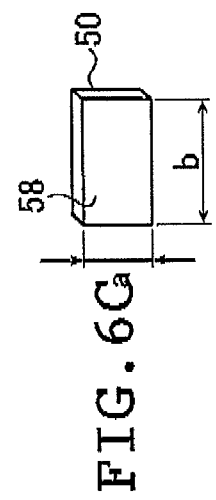
FIG. 6C is a schematic perspective view illustrating one enlarged LED chip of the light source illustrated in FIG. 6A.
Figure 6B:
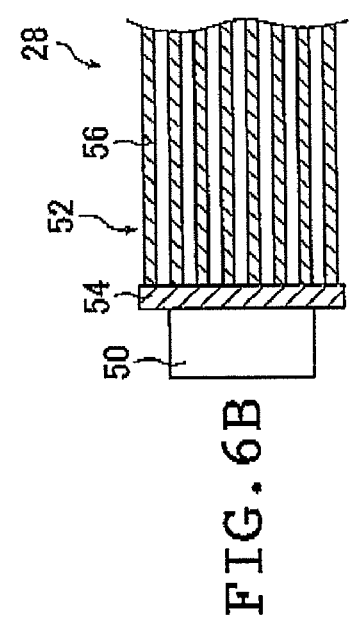
FIG. 6B is a cross sectional view of the light source illustrated in FIG. 6A.

FIG. 6A is a perspective view schematically illustrating a configuration of the light sources 28 of the planar lighting device 20 of FIGS. 1 to 5B. FIG. 6B is a cross sectional view of the light source 28 illustrated in FIG. 6A. FIG. 6C is a schematic perspective view illustrating only one light emitting diode (LED) chip 50 of the light source 28 of FIG. 6A as enlarged.

As illustrated in FIG. 6A, the light source 28 includes the LED chips 50 and a light source mount 52.

The LED chip 50 is a chip of a light emitting diode emitting blue light the surface of which has an yellow fluorescent substance applied thereon, which is the complementary color thereto. It has a light emission face 58 with a given area through which white light is emitted.

Specifically, when blue light emitted through the surface of light emitting diode of the LED chip 50 is transmitted through the fluorescent substance, the fluorescent substance is stimulated to emit yellow light. Thus, when blue light emitted by the LED chip 50 is transmitted through the fluorescent substance, the blue light emitted by the light emitting diode and the complementary yellow light radiated as the fluorescent substance generates fluorescence blend to produce and emit white light from the LED chip 50.

The LED chip 50 may, for example, be formed by applying a YAG (yttrium aluminum garnet) base fluorescent substance to the surface of a GaN base light emitting diode, an InGaN base light emitting diode, etc.

As illustrated in FIG. 6B, the light source mount 52 includes an array base 54 and fins 56. The LED chips 50 described above are arranged in a single row on the array base 54 at given intervals. Specifically, the LED chips 50 constituting the light source 28 are arrayed along the length of a first light entrance plane 30d or a second light entrance plane 30e of the light guide plate 30 to be described, that is, parallel to a line in which the light exit plane 30a and the first light entrance plane 30d cross each other, or a line in which the light exit plane 30a and the second light entrance plane 30e cross each other, and secured to the array base 54.

The array base 54 is a plate member disposed such that one surface thereof faces the light entrance plane (30d or 30e) which is the thinnest lateral end face of the light guide plate 30. The LED chips 50 are carried on a lateral plane of the array base 54 facing the light entrance plane (30d or 30e) of the light guide plate 30.

The array base 54 according to the embodiment under discussion is formed of a metal having a good heat conductance as exemplified by copper and aluminum. The array base 54 also acts as a heat sink to absorb heat generated by the LED chips 50 and release the heat to the outside.

The fins 56 are plate members each formed of a metal having a good heat conductance as exemplified by copper and aluminum. The fins 56 are connected to the array base 54 on the side thereof opposite from the LED chips 50 and spaced a given distance from neighboring fins 56.

The fins 56 provided in the light source mount 52 ensure a large surface area and a high heat dissipation efficiency, increasing the efficiency with which the LED chips 50 are cooled.

While the embodiment under discussion uses the array base 54 of the light source mount 52 as heat sink, a plate member without a heat-releasing function may be used to form the array base in place of the array base having a function of a heat sink, where the LED chips need not be cooled.

As illustrated in FIG. 6A, screw holes 52c are formed in two places of both ends of a top surface 52a of the light source mount 52. Similarly, screw holes 52d are formed in positions corresponding to the screw holes 52c in a bottom surface 52b of the light source mount 52. The screw holes 52c and 52d are used for fixing the light source 28 in the fixing means 31 with screws 31b and 31c as described below.

As illustrated in FIG. 6C, the LED chips 50 of the embodiment under discussion each have a rectangular shape such that the sides perpendicular to the direction in which the LED chips 50 are arrayed are shorter than the sides lying in the direction in which the LED chips 50 are arrayed or, in other words, the sides lying in the direction of thickness of the light guide plate 30 to be described, i.e., the direction perpendicular to the light exit plane 30a, are the shorter sides. Expressed otherwise, the LED chips 50 each have a shape defined by b>a where "a" denotes the length of the sides perpendicular to the light exit plane 30a of the light guide plate 30 and "b" denotes the length of the sides in the array direction. Now, let "q" be the distance by which the arrayed LED chips 50 are spaced apart from each other, then q>b holds. Thus, the length "a" of the sides of the LED chips 50 perpendicular to the light exit plane 30a of the light guide plate 30, the length "b" of the sides in the array direction, and the distance "q" by which the arrayed LED chips 50 are spaced apart from each other preferably have a relationship satisfying q>b>a.

Providing the LED chips 50 each having the shape of a rectangle allows a thinner design of the light source to be achieved while producing a large amount of light. A thinner light source, in turn, enables a thinner design of the planar lighting device to be achieved. Further, the number of LED chips that need to be arranged may be reduced.

While the LED chips 50 each preferably have a rectangular shape with the shorter sides lying in the direction of the thickness of the light guide plate 30 for a thinner design of the light source, the present invention is not limited thereto, allowing the LED chips to have any shape as appropriate such as a square, a circle, a polygon, and an ellipse.

While the LED chips, arranged in a single row, has a monolayered structure in the embodiment under discussion, the present invention is not limited thereto; one may use multilayered LED arrays for the light source including LED arrays each carrying LED chips 50 on the array base 54. Where the LEDs are thus stacked, more LED arrays can be stacked when the LED chips 50 are each adapted to have a rectangular shape and when the LED arrays are each adapted to have a reduced thickness. Where the LED arrays are stacked to form a multilayer structure, that is to say, where more LED arrays (LED chips) are packed into a given space, a large amount of light can be generated. Preferably, the above expression also applies to the distance separating the LED chips of an LED array from the LED chips of the LED arrays in adjacent layers. Expressed otherwise, the LED arrays preferably are stacked such that the LED chips are spaced a given distance apart from the LED chips of the LED arrays in adjacent layers.

Now, the light guide plate 30 will be described.

Figure 7:
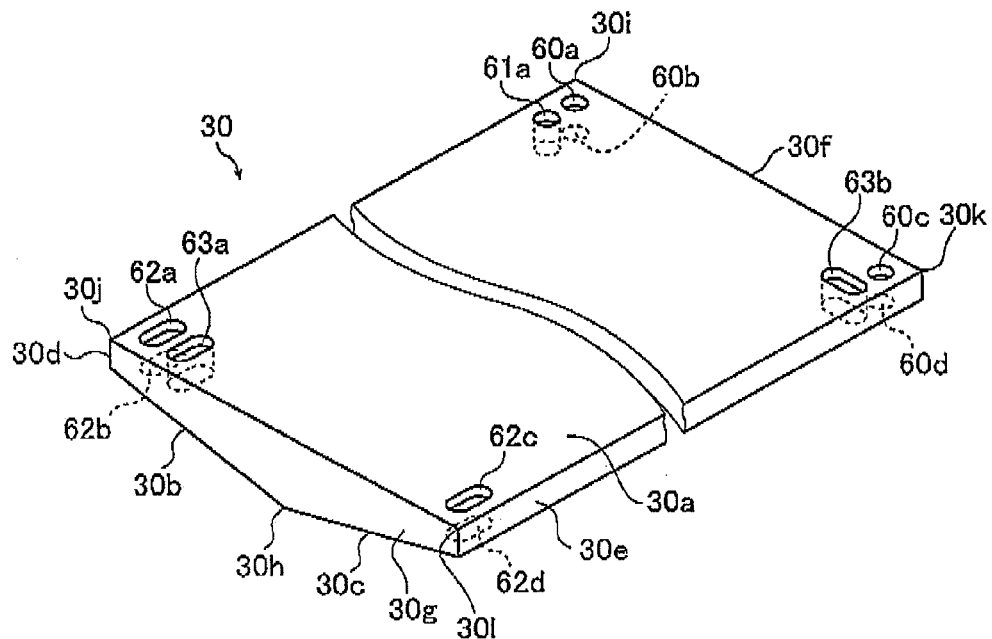
FIG. 7 is a schematic perspective view illustrating a shape of the light guide plate illustrated in FIGS. 5A and 5B.

FIG. 7 is a perspective view schematically illustrating the configuration of the light guide plate 30.

As illustrated in FIGS. 2, 3A, 5A, 5B, and 7, the light guide plate 30 includes: the light exit plane 30a, which is flat and substantially rectangular; two light entrance planes (first light entrance plane 30d and second light entrance plane 30e) formed on both sides of the light exit plane 30a and substantially perpendicular to the light exit plane 30a; two inclined planes (first inclined plane 30b and second inclined plane 30c) located on the opposite side from the light exit plane 30a, i.e., on the underside of the light guide plate 30 so as to be symmetrical to each other with respect to a central axis, or the bisector α bisecting the light exit plane 30a (see FIGS. 1 and 5A and 5B) in a direction parallel to the first light entrance plane 30d and the second light entrance plane 30e, and inclined a given angle with respect to the light exit plane 30a; and two lateral planes (first lateral plane 30f and second lateral plane 30g) formed substantially vertical to the light exit plane 30a on the sides of the light exit plane 30a on which the light entrance planes are not formed, i.e., on the two sides perpendicular to the sides where the light exit plane 30a and the light entrance planes meet. The first inclined plane 30b and the second inclined plane 30c cross each other, forming a ridge 30h corresponding to the bisector α of the light exit plane 30a.

A first circular hole 60a and a second circular hole 60c for securing the light guide plate 30 to the fixing member 31a near the insides of a corner 30i of the light exit plane 30a, in which the first light entrance plane 30d intersects the first lateral plane 30f, and a corner 30k in which the second light entrance plane 30e intersects the first lateral plane 30f. A first circular hole 60b and a second circular hole 60d are made in positions corresponding to the first circular hole 60a and the second circular hole 60c in the rear plane of the light guide plate 30.

A first long hole 62a and a second long hole 62c long in a direction parallel to the light entrance planes 30d and 30e for connecting the light guide plate 30 to the fixing member 31a are made near the insides of a corner 30j of the light exit plane 30a, in which the first light entrance plane 30d intersects the second lateral plane 30g, and a corner 30l in which the second light entrance plane 30e intersects the second lateral plane 30f. A first long hole 62b and a second long hole 62d are made in positions corresponding to the first long hole 62a and the second long hole 62c in the rear plane of the light guide plate 30.

Near the inside of the corner 30i in which the first circular hole 60a is made, a third circular hole 61a for connecting the light guide plate 30 to the upper housing 44 and the lower housing 42 of the housing 40 are made adjacent to the first circular hole 60a.

Near the insides of the corners 30i and 30k in which the first long hole 62a and the second circular hole 60c are made, a third long hole 63a and a fourth long hole 63b respectively long in a direction parallel to the light entrance plane 30e and in a direction perpendicular to the light entrance plane 30e for connecting the light guide plate 30 to the upper housing 44 and the lower housing 42 of the housing 40 are made adjacent to the first long hole 62a and the second circular hole 60c.

The first inclined plane 30b and the second inclined plane 30c are so inclined as to be distanced farther from the light exit plane 30a with the increasing distance from the first light entrance plane 30d and the second light entrance plane 30e, respectively, expressed otherwise, the thickness of the light guide plate 30 in the direction perpendicular to the light exit plane 30a increases from the first light entrance plane 30d and the second light entrance plane 30e toward the center of the light guide plate 30.

Thus, the light guide plate 30 is thinnest at both sides thereof, i.e., at the first light entrance plane 30d and the second light entrance plane 30e, and thickest at the center, i.e., on the bisector $\alpha$, where the first inclined plane 30b and the second inclined plane 30c meet. Expressed otherwise, the light guide plate 30 has such a configuration that the thickness of the light guide plate 30 in the direction perpendicular to the light exit plane 30a increases with the increasing distance from the first light entrance plane 30d or the second light entrance plane 30e. The inclination angle of the first inclined plane 30b and the second inclined plane 30c with respect to the light exit plane 30a is not specifically limited.

The two light sources 28 described above are disposed opposite the first light entrance plane 30d and the second light entrance plane 30e of the light guide plate 30, respectively. In the embodiment under discussion, the light emission face 58 of the LED chips 50 of the light sources 28 has substantially the same length as the first light entrance plane 30d and the second light entrance plane 30e in the direction perpendicular to the light exit plane 30a.

Thus, the planar lighting device 20 has the two light sources 28 disposed in such a manner as to sandwich the light guide plate 30. In other words, the light guide plate 30 is placed between the two light sources 28 arranged opposite each other with a given distance between them.

In the light guide plate 30 illustrated in FIG. 4, light emitted by the light sources 28 and admitted into the light guide plate 30 through the first light entrance plane 30d and the second light entrance plane 30e (only the first light entrance plane 30d is illustrated in the figure) is scattered as it travels through the inside of the light guide plate 30 by scatterers contained inside the light guide plate 30 as will be described later in detail and, directly or after being reflected by the first inclined plane 30b or the second inclined plane 30c, exits through the light exit plane 30a. Some light can in the process leak through the first inclined plane 30b and the second inclined plane 30c (only the first light entrance plane 30d is illustrated in the figure). However, it is then reflected by the reflection plate 34 provided on the side of the light guide plate 30 closer to the first inclined plane 30b and the second inclined plane 30c to enter the light guide plate 30 again. The reflection plate 34 will be described later in detail.

The shape of the light guide plate 30 thus growing thicker in the direction perpendicular to the light exit plane 30a with the increasing distance from the first light entrance plane 30d or the second light entrance plane 30e opposite which the light source 28 is disposed allows the light admitted through the light entrance planes to travel farther from the light entrance planes and, hence, enables a larger light exit plane to be achieved. Moreover, since the light admitted through the light entrance plane is advantageously guided to travel a long distance from the light entrance plane, a thinner design of the light guide plate is made possible.

The light guide plate 30 is formed of a transparent resin into which scattering particles are kneaded and dispersed. Transparent resin materials that may be used to form the light guide plate 30 include optically transparent resins such as polyethylene terephthalate (PET), polypropylene (PP), polycarbonate (PC), polymethyl methacrylate (PMMA), benzyl methacrylate, MS resins, and cycloolefin polymer (COP). The scattering particles kneaded and dispersed into the light guide plate 30 may be formed, for example, of TOSPEARL (trademark), silicone, silica, zirconia, or a derivative polymer. The light guide plate 30 containing the scattering particles is capable of emitting uniform illumination light through the light exit plane 30a with a greatly reduced level of brightness unevenness. The light guide plate 30 so formed may be manufactured using an extrusion molding method or an injection molding method.

Now, let $\Phi$ be the scattering cross section of scattering particles contained in the light guide plate 30; $L_G$ the length in the incident direction from the first light entrance plane 30d or the second light entrance plane 30e of the light guide plate 30 to a position where the thickness of the light guide plate 30 in the direction perpendicular to the light exit plane 30a is greatest, the incident direction, expressed otherwise, being the direction parallel to the direction in which light entering the light guide plate 30 travels and perpendicular to the line in which the light exit plane 30a and the light entrance planes (first light entrance plane 30d and second light entrance plane 30e) meet, the length $L_G$ being, in the embodiment under discussion, a half of the length of the light guide plate in the incident direction, which in the embodiment under discussion is the direction perpendicular to the first light entrance plane 30d of the light guide plate 30, as also referred to as "direction of the optical axis" below, or, still otherwise expressed, the length from the first light entrance plane or the second light entrance plane to the bisector $\alpha$; $N_p$ the density of the scattering particles contained in the light guide plate 30, the density denoting the number of particles in unit volume; and $K_c$ a compensation coefficient. Then, the value $\Phi \cdot N_p \cdot L_G \cdot K_c$ is preferably not less than 1.1 and not greater than 8.2; the compensation coefficient $K_c$ is preferably not less than 0.005 and not greater than 0.1. The light guide plate 30, containing scattering particles satisfying the above relationship, is capable of emitting uniform illumination light through the light exit plane 30a with a greatly reduced level of brightness unevenness.

When parallel rays of light are caused to enter an isotropic medium, a transmittance T is generally expressed according to the Lambert-Beer law by the following expression (1):

$$T = I/I_o = \exp(-\rho \cdot x) \quad (1)$$

where x is a distance, $I_o$ an intensity of incident light, I an intensity of outgoing light, and $\rho$ an attenuation constant.

The above attenuation constant $\rho$ can be expressed using the scattering cross section of particles $\Phi$ and the number of particles $N_p$ in unit volume contained in the medium as follows.

$$\rho = \Phi \cdot N_p \quad (2)$$

Accordingly, the light extraction efficiency $E_{out}$ is expressed by the following expression (3) where $L_G$ is the length of the light guide plate in the direction parallel to the direction in which light entering the light guide plate travels from the light entrance planes of the light guide plate as far as the thickest position or, in the embodiment under discussion, a half of the length of the light guide plate 30 in the direction of the optical axis. The half of the length of the light guide plate 30 in the direction of the optical axis denoted by $L_G$ is the length of the light guide plate 30 in the direction perpendicular to the light entrance planes of the light guide plate 30 from one of the light entrance planes of the light guide plate 30 to the center of the light guide plate 30.

The light extraction efficiency $E_{out}$ is a ratio of light reaching the position spaced apart from the light entrance plane of the light guide plate by the length $L_G$ in the direction of the optical axis to the incident light. In the case of the light guide plate 30 illustrated in FIGS. 5A and 5B, for example, the light extraction efficiency $E_{out}$ is a ratio of light reaching the center of the light guide plate or, light traveling half the length of the light guide plate in the direction of the optical axis to the light incident on either end plane.

$$E_{out} \propto \exp(-\Phi \cdot N_p \cdot L_G) \quad (3)$$

The expression (3) applies to a space of limited dimensions. Introducing the compensation coefficient $K_c$ therein to correct the relationship with the expression (1), the light extraction efficiency $E_{out}$ is expressed by the following expression (4). The compensation coefficient $K_c$ is a dimensionless compensation coefficient empirically obtained where light propagates through an optical medium of limited dimensions.

$$E_{out} = \exp(-\Phi \cdot N_p \cdot L_G \cdot K_c) \quad (4)$$

According to the expression (4), when 101 $\cdot N_p \cdot L_G \cdot K_c$ is 3.5, the light extraction efficiency $E_{out}$ is 3%. When $\Phi \cdot N_p \cdot L_G \cdot K_c$ is 4.7, the light extraction efficiency $E_{out}$ is 1%.

The results show that the light extraction efficiency $E_{out}$ decreases as $\Phi \cdot N_p \cdot L_G \cdot K_c$ increases. The light extraction efficiency $E_{out}$ decreases in such a manner presumably because light is scattered increasingly as it travels in the direction of the optical axis of the light guide plate.

It follows, therefore, that the greater the value $\Phi \cdot N_p \cdot L_G \cdot K_c$ is, the more preferable it is as a property for the light guide plate. When $\Phi \cdot N_p \cdot L_G \cdot K_c$ is great, light exiting through a plane opposite the light entrance plane can be reduced whereas light emitted through the light exit plane can be increased. Expressed otherwise, when $\Phi \cdot N_p \cdot L_G \cdot K_c$ is great, the ratio of light emitted through the light exit plane to the light incident on the light entrance planes can be increased. That ratio is also referred to as "light use efficiency" below. Specifically, a light use efficiency as high as 50% or more is achieved when $\Phi \cdot N_p \cdot L_G \cdot K_c$ is 1.1 or greater.

While light emitted through the light exit plane 30a of the light guide plate 30 increasingly exhibits illuminance unevenness as $\Phi \cdot N_p \cdot L_G \cdot K_c$ increases, the illuminance unevenness can be held to under a given, tolerable level by holding the value $\Phi \cdot N_p \cdot L_G \cdot K_c$ to 8.2 or less. Note that illuminance and brightness can be treated substantially equally. Thus, it is assumed that brightness and illuminance possess similar tendencies in the present invention.

Thus, the value $\Phi \cdot N_p \cdot L_G \cdot K_c$ of the inventive light guide plate 30 is preferably not less than 1.1 and not greater than 8.2, and more preferably not less than 2.0 and not greater than 8.0. Still more preferably, the value $\Phi \cdot N_p \cdot L_G \cdot K_c$ is not less than 3.0 and, most preferably, not less than 4.7.

The compensation coefficient $K_c$ is preferably not less than 0.005 and not greater than 0.1, thus $0.005 \leq K_c \leq 0.1$.

Now, the light guide plate 30 will be described in greater detail by referring to specific examples.

A computer simulation was conducted to obtain light use efficiencies for different light guide plates given different values of $\Phi \cdot N_p \cdot L_G \cdot K_c$ by varying the scattering cross section $\Phi$, the particle density $N_p$, the length $L_G$, which is a half of the length of the light guide plate in the direction of the optical axis, and the compensation coefficient $K_c$. Further, illuminance unevenness was evaluated. The illuminance unevenness [%] was defined as $[(I_{Max} - I_{Min})/I_{Ave}] \times 100$, where $I_{Max}$ was a maximum illuminance of light emitted through the light exit plane of the light guide plate, $I_{Min}$ a minimum illuminance, and $I_{Ave}$ an average illuminance.

The measurement results are shown in Table 1. In Table 1, judgments "o" indicate cases where the light use efficiency is 50% or more and the illuminance unevenness is 150% or less whereas judgments "x" indicate cases where the light use efficiency is less than 50% or the illuminance unevenness is more than 150%.

TABLE 1

|  | $\Phi$ [m$^2$] | $N_p$ [pcs/m$^3$] | $L_G$ [m] | $K_C$ | $\Phi \cdot N_p \cdot L_G \cdot K_C$ | Light use efficiency [%] | Illuminance unevenness [%] | Judgment |
|---|---|---|---|---|---|---|---|---|
| Example 1 | $2.0 \times 10^{-12}$ | $2.2 \times 10^{14}$ | 0.3 | 0.03 | 3.51 | 81.6 | 84 | o |
| Example 2 | $2.0 \times 10^{-12}$ | $4.3 \times 10^{14}$ | 0.3 | 0.02 | 6.21 | 84.7 | 149 | o |
| Example 3 | $2.0 \times 10^{-12}$ | $8.6 \times 10^{14}$ | 0.1 | 0.02 | 3.86 | 82.8 | 82 | o |
| Example 4 | $1.1 \times 10^{-10}$ | $1.5 \times 10^{13}$ | 0.3 | 0.008 | 3.91 | 83.0 | 105 | o |
| Example 5 | $1.1 \times 10^{-10}$ | $2.0 \times 10^{13}$ | 0.3 | 0.007 | 4.98 | 84.3 | 142 | o |
| Example 6 | $1.1 \times 10^{-10}$ | $3.5 \times 10^{13}$ | 0.1 | 0.007 | 2.86 | 79.2 | 47 | o |
| Comparative example 1 | $2.0 \times 10^{-12}$ | $2.2 \times 10^{13}$ | 0.3 | 0.05 | 0.66 | 29.1 | 51 | x |
| Comparative example 2 | $1.1 \times 10^{-12}$ | $2.5 \times 10^{12}$ | 0.3 | 0.01 | 0.99 | 43.4 | 59 | x |

TABLE 1-continued

|  | Φ [m²] | $N_p$ [pcs/m³] | $L_G$ [m] | $K_C$ | $\Phi \cdot N_p \cdot L_G \cdot K_C$ | Light use efficiency [%] | Illuminance unevenness [%] | Judgment |
|---|---|---|---|---|---|---|---|---|
| Comparative example 3 | $4.8 \times 10^{-18}$ | $8.6 \times 10^{17}$ | 0.1 | 15.2 | 6.26 | 84.8 | 201 | x |
| Comparative example 4 | $4.8 \times 10^{-18}$ | $1.7 \times 10^{18}$ | 0.1 | 13.9 | 11.5 | 84.9 | 225 | x |

Figure 8:
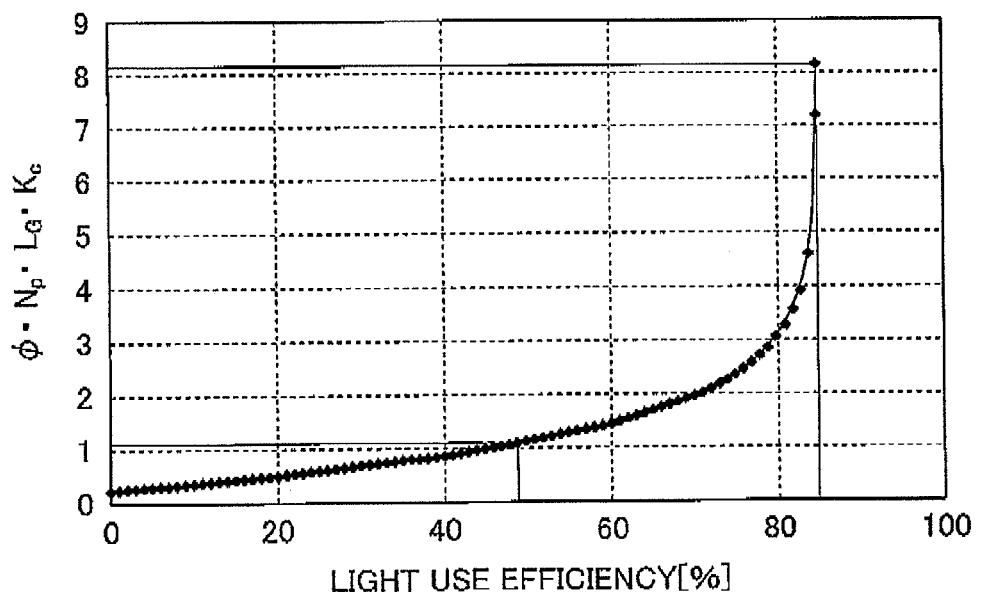
FIG. 8 is a graph illustrating measurements representing a relationship between $\Phi \cdot N_p \cdot L_G \cdot K_c$ and light use efficiency.

FIG. 8 illustrates a relationship between $\Phi \cdot N_p \cdot L_G \cdot K_c$ and light use efficiency (ratio of light emitted through the light exit plane 30a to light incident on the light entrance planes).

Table 1 and FIG. 8 show that given $\Phi \cdot N_p \cdot L_G \cdot K_c$ of 1.1 or more, a high light use efficiency, specifically 50% or more, is achieved whereas given $\Phi \cdot N_p \cdot L_G \cdot K_c$ of 8.2 or less, illuminance unevenness can be held to 150% or less.

It is also shown that given $K_c$ of 0.005 or more, a high light use efficiency is achieved, and given $K_c$ of 0.1 or less, illuminance unevenness observed in light emitted from the light guide plate can be reduced to a low level.

Next, light guide plates varying in particle density $N_p$ of the particles kneaded or dispersed therein were fabricated to measure brightness distributions of light emitted at different positions in the light exit plane of the individual light guide plates. In the embodiment under discussion, the conditions including scattering cross section Φ, length $L_G$, which is a half of the length of the light guide plate in the direction of the optical axis, compensation coefficient $K_c$, and shape of the light guide plate, but excluding particle density $N_p$, were respectively set to fixed values as the measurements were made. In the embodiment under discussion, therefore, the value $\Phi \cdot N_p \cdot L_G \cdot K_c$ changes in proportion as the particle density $N_p$ changes.

Figure 9:
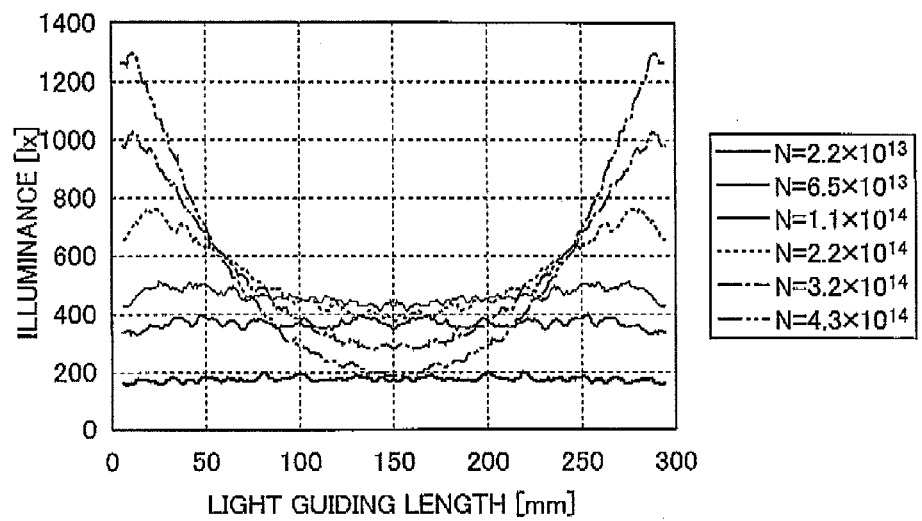
FIG. 9 is a graph illustrating measurements representing illuminances of light emitted from light guide plates having different particle densities.

FIG. 9 shows the measurements of the distribution of illuminance observed in the light emitted through the light exit plane of the individual light guide plates having different particle densities. FIG. 9 shows the illuminance [lx] on the vertical axis plotted against a light guiding length, which is the distance [mm] from one of the light entrance planes of the light guide plate on the horizontal axis.

Illuminance unevenness was calculated from $[(I_{Max} - I_{Min})/I_{Ave}] \times 100[\%]$, where $I_{Max}$ was a maximum illuminance in the measured distribution of light emitted from areas of the light exit plane close to the lateral ends thereof, $I_{Min}$ a minimum illuminance, and $I_{Ave}$ an average illuminance.

Figure 10:
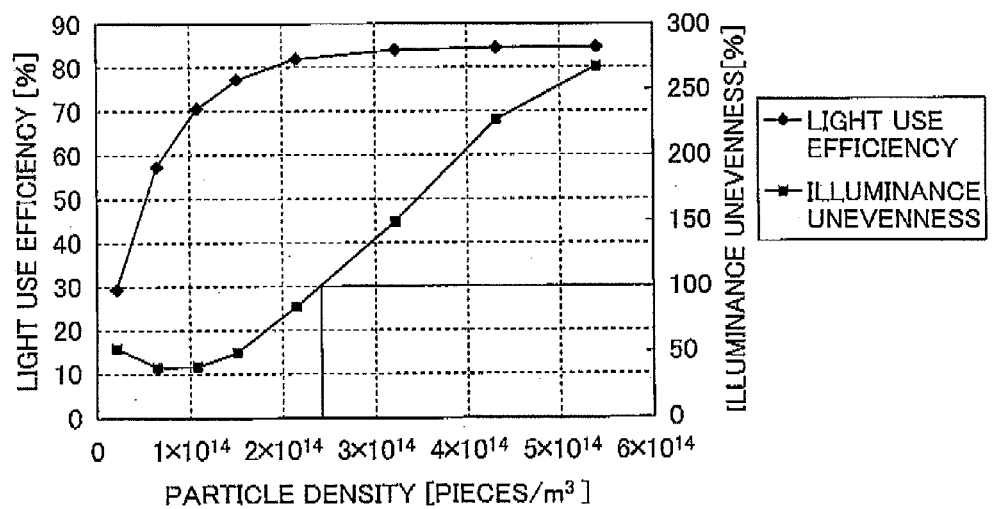
FIG. 10 is a graph illustrating relationships between light use efficiency and illuminance unevenness on the one hand and particle density on the other.

FIG. 10 illustrates a relationship between the calculated illuminance unevenness and particle density. FIG. 10 shows the illuminance unevenness [%] on the vertical axis plotted against the particle density [pieces/m³] on the horizontal axis. Also shown in FIG. 10 is a relationship between light use efficiency and particle density, the particle density being likewise indicated on the horizontal axis and the light use efficiency [%] on the vertical axis.

As shown in FIGS. 9 and 10, increasing the particle density or, consequently, increasing $\Phi \cdot N_p \cdot L_G \cdot K_c$, results in an enhanced light use efficiency but then illuminance unevenness also increases. The graphs also show that reducing the particle density or, consequently, reducing $\Phi \cdot N_p \cdot L_G \cdot K_c$, results in a lowered light use efficiency but then illuminance unevenness decreases.

$\Phi \cdot N_p \cdot L_G \cdot K_c$ of not less than 1.1 and not greater than 8.2 yields a light use efficiency of 50% or more and illuminance unevenness of 150% or less. Illuminance unevenness, when reduced to 150% or less, is inconspicuous.

Thus, it will be understood that $\Phi \cdot N_p \cdot L_G \cdot K_c$ of not less than 1.1 and not greater than 8.2 yields a light use efficiency above a certain level and a reduced illuminance unevenness.

Next, the optical member unit 32 will be described.

The optical member unit 32 serves to reduce the brightness unevenness of the illumination light emitted through the light exit plane 30a of the light guide plate 30 to achieve emission of light with reduced brightness unevenness through a light exit plane 24a of the main body of the lighting device 24. As illustrated in FIG. 4, the optical member unit 32 includes a diffusion sheet 32a for diffusing the illumination light emitted through the light exit plane 30a of the light guide plate 30 to reduce brightness unevenness, a prism sheet 32b having micro prism arrays formed parallel to the lines where the light exit plane and the light entrance planes meet, and a diffusion sheet 32c for diffusing the illumination light emitted through the prism sheet 32b to reduce brightness unevenness.

Preferably, the optical member unit 32 includes similar circular holes and long holes in positions corresponding to the first circular hole 60a, the second circular hole 60c, the first long hole 62a, and the second long hole 62c made in the light exit plane 30a of the light guide plate 30 to secure the light source 28 and the light guide plate 30 to the fixing member 31a to fix the same. To connect the light guide plate 30 to the upper housing 44 and the lower housing 42 of the housing 40, the optical member unit 32 preferably includes similar circular holes and long holes, though not shown, in positions corresponding to the third circular hole 61a, the third long hole 63a, and the fourth long hole 63b made in the light exit plane 30a of the light guide plate 30.

As the diffusion sheets 32a and 32c and the prism sheet 32b, use may be made of the diffusion sheets and the prism sheets disclosed in paragraphs [0028] through [0033] of JP 2005-234397 A by the Applicant of the present application.

While the optical member unit in the embodiment under discussion includes the two diffusion sheets 32a and 32c and the prism sheet 32b between the two diffusion sheets, there is no specific limitation to the order in which the prism sheet and the diffusion sheets are arranged or the number thereof to be provided. Nor are the prism sheet and the diffusion sheets specifically limited, and use may be made of various optical members, provided that they are capable of reducing the brightness unevenness of the illumination light emitted through the light exit plane 30a of the light guide plate 30.

For example, the optical members may also be formed of transmittance adjusting members each including a number of transmittance adjusters consisting of diffusion reflectors distributed according to the brightness unevenness in addition to or in place of the diffusion sheets and the prism sheet described above.

Though not illustrated in FIG. 4, the third circular hole 61a, the third long hole 63a, and the fourth long hole 63b are preferably made near the three corners 30i, 30j, and 30k of the light guide plate 30, as illustrated in FIGS. 5A and 7, to connect the light guide plate 30 to the upper housing 44 and the lower housing 42 of the housing 40 and, as described above, corresponding to the third circular hole 61a, the third long hole 63a, and the fourth long hole 63b of the light guide plate 30, similar circular holes and long holes are preferably made (not shown) in the optical member unit 32 which includes the diffusion sheet 32a, the prism sheet 32b, and the diffusion sheet 32c, and in an upper light guide reflection plate 36 and a lower light guide reflection plate 38. In the upper housing 44 and the lower housing 42 of the housing 40, circular holes (not shown) for securing pins are bored in positions corresponding to the third circular hole 61a, the third long hole 63a, and the fourth long hole 63b of the light guide plate 30 to be housed therein. Pins (not shown) substantially equal in hole diameter (shorter diameter in the case of long holes) are fitted in the third circular hole 61a, the third long hole 63a, the fourth long hole 63b of the light guide plate 30, and the corresponding circular holes and longs holes of the optical member unit 32, the upper light guide reflection plate 36, and the lower light guide reflection plate 38. Those pins are also fitted in the circular holes bored in the upper housing 44 and the lower housing 42 of the housing 40.

In this case, the light guide plate 30 is secured to the housing 40 by pins (not shown) fixed to the housing 40 in the corner 30i to be inhibited from moving because of the circular hole 61a made in the corner 30i of the light guide plate 30 as illustrated in FIGS. 5A and 7.

The long hole 63a long in the direction parallel to the light entrance planes 30d and 30e is made in the corner 30j of the light guide plate 30, while no hole for connection with the housing 40 is made in the corner 30l. Thus, since the pin (not shown) secured to the housing 40 is movable in the direction parallel to the light entrance planes 30d and 30e in the long hole 63a while fitted in the long hole 63a, the light guide plate 30 can move in the direction parallel to the light entrance planes 30d and 30e with respect to the housing 40 to be expanded/contracted. As a result, a warp that might otherwise be caused by expansion/contraction of the light guide plate 30 can be prevented.

The long hole 63b long in the direction perpendicular to the light entrance planes 30d and 30e is made in the corner 30k of the light guide plate 30, while no hole is made for connection with the housing 40 in the corner 30l. Accordingly, since the pin (not shown) secured to the housing 40 is movable in the direction perpendicular to the light entrance planes 30d and 30e in the long hole 63b while fitted in the long hole 63b, the light guide plate 30 can move in the direction perpendicular to the light entrance planes 30d and 30e with respect to the housing 40 to be expanded/contracted. As a result, a warp that might otherwise be caused by expansion/contraction of the light guide plate 30 can be prevented.

Thus, the light guide plate 30 can be held expandable and contractible in the housing 40.

As described above, corresponding to the third circular hole 61a, the third long hole 63a, and the fourth long hole 63b of the light guide plate 30, similar circular holes and long holes (not shown) are made in the optical member unit 32 which includes the diffusion sheet 32a, the prism sheet 32b and the diffusion sheet 32c, and in the upper guide reflection plate 36 and the lower light guide reflection plate 38. Thus, even when the light guide plate 30 and the optical member unit 32 such as the diffusion sheet 32a, the prism sheet 32b, and the diffusion sheet 32c are different in expansion/contraction rate, a holding mechanism capable of preventing any deflection and warp thereof can be realized.

Now, the reflection plate 34 of the main body of the lighting device 24 will be described with reference to FIG. 4.

The reflection plate 34 is provided to reflect light leaking through the first inclined plane 30b and the second inclined plane 30c of the light guide plate 30 (see FIG. 5B) back into the light guide plate 30 and helps enhance the light use efficiency. The reflection plate 34 is shaped according to the contour of the first inclined plane 30b and the second inclined plane 30c of the light guide plate 30 to cover the whole surfaces of the first inclined plane 30b and the second inclined plane 30c. In the embodiment under discussion, the reflection plate 34 is shaped to contour the sectionally triangular shape formed by the first inclined plane 30b and the second inclined plane 30c as illustrated in FIG. 5B.

The reflection plate 34 may be formed of any material as desired, provided that it is capable of reflecting light leaking through the inclined planes of the light guide plate 30. The reflection plate 34 may be formed, for example, of a resin sheet produced by kneading, for example, PET or polypropylene (PP) with a filler and then drawing the resultant mixture to form voids therein for increased reflectance; a sheet with a specular surface formed by, for example, depositing aluminum vapor on the surface of a transparent or white resin sheet; a metal foil such as an aluminum foil or a resin sheet carrying a metal foil; or a thin sheet metal having a sufficient reflective property on the surface.

The upper light guide reflection plates 36 are disposed, inside the fixing member 31a, between the light guide plate 30 and the diffusion sheet 32a, i.e., on the side of the light guide plate 30 closer to the light exit plane 30a, covering the light sources 28 and the end portions of the light exit plane 30a of the light guide plate 30, i.e., the end portion thereof closer to the first light entrance plane 30d and the end portion thereof closer to the second light entrance plane 30e. Thus, the upper light guide reflection plates 36 are disposed to cover an area extending from part of the light exit plane 30a of the light guide plate 30 as far as part of the array bases 54 of the light sources 28 in a direction parallel to the direction of the optical axis. Briefly, two upper light guide reflection plates 36 are disposed respectively on both end portions of the light guide plate 30.

The upper light guide reflection plates 36 thus provided prevent light emitted by the light sources 28 from leaking toward the light exit plane 30a instead of entering the light guide plate 30.

Thus, light emitted from the LED chips 50 of the light sources 28 is efficiently admitted through the first light entrance plane 30d and the second light entrance plane 30e of the light guide plate 30, increasing the light use efficiency.

The lower light guide reflection plates 38 are disposed, inside the fixing member 31a, on the side of the light guide plate 30 opposite from the light exit plane 30a, i.e., on the same side as the first inclined plane 30b and the second inclined plane 30c, covering part of the light sources 28. The end portions of the lower light guide reflection plates 38 closer to the center of the light guide plate 30 are connected to the reflection plate 34.

The lower light guide reflection plates 38 prevent light emitted by the light sources 28 from leaking toward the first inclined plane 30b and the second inclined plane 30c of the light guide plate 30 instead of entering the light guide plate 30.

Thus, light emitted from the LED chips 50 of the light sources 28 is efficiently admitted through the first light entrance plane 30d and the second light entrance plane 30e of the light guide plate 30, increasing the light use efficiency.

The upper light guide reflection plates 36 and the lower light guide reflection plates 38 may be formed of any of the above-mentioned materials used to form the reflection plate 34.

While the reflection plate 34 is connected to the lower light guide reflection plates 38 in the embodiment under discussion, their configuration is not so limited; they may be formed of separate materials.

Preferably, the upper guide reflection plate 36 and the lower light guide reflection plate 38 include, to secure the light source 28 and the light guide plate 30 to the fixing member 31a for integrating them, similar circular holes and long holes in positions corresponding to the first circular holes 60a and 60b, the second circular holes 60c and 60d, the first long holes 62a and 62b, and the second long holes 62c and 62d made in the light exit plane 30a of the light guide plate 30. Preferably, though not shown, the upper guide reflection plate 36 and the lower light guide reflection plate 38 include, to connect the light guide plate 30 to the upper housing 44 and the lower housing 42 of the housing 40, similar circular holes and long holes in positions corresponding to the third circular hole 61a, the third long hole 63a, and the fourth long hole 63b made in the light exit plane 30a of the light guide plate 30.

The shapes and the widths of the upper light guide reflection plates 36 and the lower light guide reflection plates 38 are not limited specifically, provided that light emitted by the light sources 28 is reflected and directed toward the first light entrance plane 30d or the second light entrance plane 30e such that light emitted by the light sources 28 can be admitted through the first light entrance plane 30d or the second light entrance plane 30e and then guided toward the center of the light guide plate 30.

While, in the embodiment under discussion, the upper light guide reflection plates 36 are disposed between the light guide plate 30 and the diffusion sheet 32a, the location of the upper light guide reflection plates 36 is not so limited; it may be disposed between the sheets constituting the optical member unit 32 or between the optical member unit 32 and the fixing member 31a.

Next, the fixing means 31 will be described.

As illustrated in FIG. 4, the fixing means 31 includes the fixing member 31a for fixing and integrating the light source 28 and the light guide plate 30, the screws 31b and 31c for securing the light source 28 to the fixing member 31a, and fixing pins 31d and 31e for fixing the light guide plate 30 to the fixing member 31a.

The fixing member 31a fixes and integrates the light source 28 and the light guide plate 30 by keeping constant an optical axis distance and an optical axis perpendicular distance between the light source 28 and the light guide plate 30, and slides on the upper sliding member 48b and the lower sliding member 48c secured to the housing 40 with the sliding member fixing member 48a using the sliding mechanism 48 corresponding to expansion/contraction of the light guide plate 30. According to the embodiment, the fixing member 31a is a columnar member having a U-shaped sectional profile.

The fixing member 31a slides into contact with the upper sliding member 48b and the lower sliding member 48c, thereby preventing a warp of the light guide plate 30 even when the light guide plate 30 is expanded/contracted in the direction perpendicular to the light entrance planes 30d and 30e of the light guide plate 30.

The frictional force of the sliding portion increases with the contact area between the fixing member 31a and the upper sliding member 48b and the lower sliding member 48c. The frictional force of the sliding portion decreases with the contact area therebetween. Thus, preferably, the fixing member 31a is shaped such that the contact area between the fixing member 31a and the upper sliding member 48b and the lower sliding member 48c increases as the light guide plate 30 expands, thereby increasing the frictional force of the sliding portion to suppress sliding of the fixing member 31a, and the contact area between the fixing member 31a and the upper sliding member 48b and the lower sliding member 48c decreases as the light guide plate 30 contracts, thereby reducing the frictional force of the sliding portion to facilitate sliding of the fixing member 31a.

As illustrated in FIG. 4, the light source 28 is integrally secured to the fixing means 31 by the screws 31b and 31c. The light guide plate 30, the optical member unit 32, and the reflection plate 34 are integrally secured to the fixing means 31 by the fixing pins 31d and 31e.

In other words, the light source 28 is positioned by the fixing member 31a to be secured by screwing the screws 31b and 31c with the screw holes 52c and 52d (see FIG. 7) and the screw holes of the fixing member 31a.

As illustrated in FIG. 7, the light guide plate 30 is positioned and secured to the fixing member 31a on both sides of the first lateral plane 30f of the light guide plate 30 as the fixing pins 31d and 31e fitted in the fitting holes made in the fixing member 31a fit in the first circular holes 60a and 60b and the second circular holes 60c and 60d respectively made in the light exit plane 30a and the rear plane of the light guide plate 30. Diameters of the first circular holes 60a and 60b and the second circular holes 60c and 60d are substantially equal to outer diameters of the fixing pins 31d and 31e. Thus, the light guide plate 30 is positioned by the fixing member 31a in both directions perpendicular and parallel to the first light entrance plane 30d and the second light entrance plane 30e on its first lateral plane 30f side. As a result, the fixing member 31a integrates and fixes the light source 28 and the light guide plate 30, thereby keeping constant a distance between the light exit plane of the light source 28 and the first light entrance plane 30d and the second light entrance plane 30e of the light guide plate 30.

On both sides of the second lateral plane 30g of the light guide plate 30, the fixing pins 31d and 31e fitted in the fitting holes made in the fixing member 31a are inserted into the first long holes 62a and 62b and the second long holes 62c and 62d respectively made in the light exit plane 30a and the rear plane of the light guide plate 30. The first long holes 62a and 62b and the second long holes 62c and 62d are long in a direction parallel to the first light entrance plane 30d and the second light entrance plane 30e of the light guide plate 30, and diameters thereof in a perpendicular direction are substantially equal to outer diameters of the fixing pins 31d and 31e. Thus, the fixing pins 31d and 31e are fixed without moving in the direction perpendicular to the first light entrance plane 30d and the second light entrance plane 30e of the light guide plate 30, and fitted to be movable in the parallel direction with respect to the first long holes 62a and 62b and the second long holes 62c and 62d.

Thus, on both sides of the second lateral plane 30g, the light guide plate 30 is positioned and secured by the fixing member 31a in the direction perpendicular to the first light entrance plane 30d and the second light entrance plane 30e. However, in the parallel direction, the light guide plate 30 is movable without being positioned by the fixing member 31a.

As a result, in the direction perpendicular to the first light entrance plane 30d and the second light entrance plane 30e of the light guide plate 30, the fixing member 31a integrates and fixes the light source 28 and the light guide plate 30, thereby keeping constant a distance between the light exit plane of the light source 28 and the first light entrance plane 30*d* and the second light entrance plane 30*e* of the light guide plate 30.

In the direction parallel to the first light entrance plane 30*d* and the second light entrance plane 30*e* of the light guide plate 30, according to expansion/contraction of the light guide plate 30, the fixing pins 31*d* and 31*e* move (slide) in the first long holes 62*a* and 62*b* and the second long holes 62*c* and 62*d*, thereby preventing a warp of the light guide plate 30 that might otherwise be caused by its expansion/contraction.

Thus, on both of the first lateral plane 30*f* side and the second lateral plane 30*g* side of the light guide plate 30, the fixing member 31*a* integrates and fixes the light source 28 and the light guide plate 30, thereby keeping constant a distance between the light exit plane of the light source 28 and the first light entrance plane 30*d* and the second light entrance plane 30*e* of the light guide plate 30. This way, the light sources 28 disposed on the first light entrance plane 30*d* side and the second light entrance plane 30*e* side are prevented from being destroyed by expansion/contraction of the light guide plate 30. Moreover, light admission efficiency of light emitted from the light sources 28 to the first light entrance plane 30*d* and the second light entrance plane 30*e* of the light guide plate 30 is prevented from being reduced.

Even when the light source 28 and the light guide plate 30 are fixed and integrated, when the light guide plate 30 is expanded/contracted in the direction parallel to the light entrance planes (30*d* and 30*e*) of the light guide plate 30, the positions of the fixing pins 31*d* and 31*e* are moved in the long axis direction in the long holes according to the expansion/contraction of the light guide plate 30. Thus, the light guide plate 30 can be freely expanded/contracted, a warp of the light guide plate 30 can be suppressed, and brightness unevenness of light emitted from the light guide plate 30 can be suppressed. Even when the light guide plate 30 is increased in dimensions, the light guide plate 30 is freely expanded/contracted in the direction parallel to the light entrance planes (30*d* and 30*e*) of the light guide plate, whereby a warp of the light guide plate 30 can be suppressed.

Corresponding to the circular holes 60*a* to 60*d* and the long holes 62*a* to 62*d* made in the light guide plate 30, the circular holes and the long holes made in the optical member unit 32 and the reflection plate 34 (upper light guide reflection plate 38 and lower light guide reflection plate 36) are made to pass the pins 31*d* and 31*e* for fixing the fixing member 31*a*, the light guide plate 30, the optical member unit 32, and the reflection plate 34.

The circular holes 60*a* to 60*d* are made near the insides of the corners 30*i* and 30*k* of the light guide plate 30. This way, even when the liquid crystal display device 10 or the backlight unit 20 is installed with the direction parallel to the light entrance planes 30*d* and 30*e* set as an up-and-down direction, damaging of the light guide plate 30 caused by up-and-down positional shifting of the light guide plate 30 can be prevented.

This arrangement of the circular holes is in no way limitative. By arranging the circular holes in positions in which the position of the light guide plate 30 is not shifted according to an arrangement and a direction of the liquid crystal display device 10, thus the backlight unit 20, damaging of the light guide plate 30 can be prevented.

According to the embodiment, the screw holes 52*c* and 52*d* are made in the two places of the top surface 52*a* and the bottom surface 52*b* of the light source mount 52 of the light source 28 to secure the light source 28 and the fixing member 31*a*. However, other arrangements and numbers of screw holes may be employed as long as the light source 28 and the fixing member 31*a* can be secured.

According to the embodiment, the screws are used for securing the light source 28 and the fixing member 31*a*. However, fixing tools for the light source 28 and the fixing member 31*a* are not limited to the screws. Various known fixing tools can be used. For example, the light source 28 and the fixing member 31*a* may be secured by using adhesives. This way, the structure can be made simpler since there is no need to make any screw holes in the light source mount 52.

The method involving securing the light guide plate 30 and the fixing member 31*a* is not limited to the circular holes or the pins. For example, in place of the circular holes and the pins, adhesives may be applied to the insides of the corners of the light exit plane 30*a* and the rear plane of the light guide plate 30 to secure the light guide plate 30 and the fixing member 31*a*.

Next, the housing 40 will be described.

As illustrated in FIG. 4, the housing 40 accommodates and secures therein the main body of the lighting device 24 by holding it from above and both sides thereof, i.e., the light exit plane 24*a* and the first inclined plane 30*b* and the second inclined plane 30*c* of the light guide plate 30. The housing 40 includes the lower housing 42, the upper housing 44, the reinforcing members 46, and the sliding mechanism 48.

The lower housing 42, as illustrated in FIGS. 2, 3A, and 3B, is open at the top and has a configuration including a bottom section 42*a* and lateral sections 42*b* provided upright on the four sides of the bottom section 42*a*. Briefly, it has substantially the shape of a rectangular box open on one side. The bottom section 42*a* and the lateral sections 42*b* support the main body of the lighting device 24 placed therein from above on the underside and on the lateral sides 42*b* and covers the faces of the main body of the lighting device 24 except the light exit plane 24*a*, i.e., the plane opposite from the light exit plane 24*a* of the main body of the lighting device 24 (rear side) and the lateral sections 42*b*.

The upper housing 44 has the shape of a rectangular box; it has an opening at the top that is slightly smaller than the rectangular light exit plane 30*a* of the light guide plate 30 and which is the light exit plane 24*a* of the main body of the lighting device 24. The upper housing 44 is open on the bottom side.

The upper housing 44 is placed from above the main body of the lighting device 24 and the lower housing 42, that is, from the light exit plane side, to cover the main body of the lighting device 24 and the lower housing 42, which holds the former, as well as four lateral sections 22*b* of the lower housing 42.

The reinforcing member 46 illustrated in FIG. 4 is a bar-shaped member having a rectangular cross section and disposed between the upper housing 44 and the lower housing 42. This reinforcing member 46 is connected to the upper housing 44 and the lower housing 42 by screws 46*a* and 46*b*.

Thus providing the reinforcing members 46 between the lower housing 42 and the upper housing 44 increases the rigidity of the housing 40 and prevents the light guide plate 30 from warping due to expansion/contraction thereof. As a result, for example, light can be efficiently emitted without, or with a greatly reduced level of, brightness unevenness. Further, even where the light guide plate used is liable to develop a warp, the warp can be corrected with an increased certainty or the warping of the light guide plate can be prevented with an increased certainty, thereby allowing light to be emitted through the light exit plane without brightness unevenness or with a greatly reduced level of brightness unevenness.

Screwing and fixing the lower housing 42 and the upper housing 44 and the reinforcing member 46 with the screws 46a and 46b enable generation of stress for screwing the fixing means 31, especially the fixing member 31a in the sliding mechanism 48.

The lower housing 42, the upper housing 42, and the reinforcing member 46 of the housing 40 may be formed of various materials including metals and resins. Note that the material preferably is lightweight and offers high rigidity.

According to the present invention, as detailed below, the shape of the reinforcing member 46 may be improved in various ways as illustrated in FIGS. 3A and 3B and 13A to 16C, whereby the rigidity of the housing 40 can be further enhanced.

The sliding mechanism 48 makes the fixing member 31a of the fixing means 31 slidable according to expansion/contraction of the light guide plate 30 in the direction perpendicular to the light entrance planes 30d and 30e of the light guide plate 30, and includes a spring member 47, the sliding member fixing members 48a and 48d, the upper sliding member 48b, and the lower sliding member 48c.

The spring member 47 is disposed between the sliding member fixing member 48a and the fixing member 31a to press the fixing members 31a respectively provided on the first light entrance plane 30d side and the second light entrance plane 30e side from the same toward the center of the light guide plate 30, and to position the fixing member 31a with respect to the housing 40 in the direction perpendicular to the light entrance planes 30d and 30e of the light guide plate 30.

The spring member 47 is similarly disposed between the first lateral plane 30g and the second lateral plane 30f of the light guide plate 30 and the housing 40 to position the fixing member 31a with respect to the housing 40 in the direction parallel to the light entrance planes 30d and 30e of the light guide plate 30.

The sliding member fixing members 48a and 48d hold the upper sliding member 48b and the lower sliding member 48c for sliding the fixing means 31 (fixing member 31a). The sliding member fixing members 48a and 48d are disposed between the lower housing 42 and the upper housing 44. The upper sliding member 48b is disposed on the underside of the sliding member fixing member 48d, and the lower sliding member 48c is disposed on the top surface of the sliding member fixing member 48a.

The upper sliding member 48b and the lower sliding member 48c sandwich the fixing means 31 (fixing member 31a), and slide the fixing means 31 (fixing member 31a) corresponding to expansion/contraction of the light guide plate 30 in the direction perpendicular to the light entrance plane. As illustrated in FIG. 4, the upper sliding member 48b and the lower sliding member 48c are plate-shaped members.

According to the present invention, for the reinforcing member, in place of the reinforcing member 46 illustrated in FIGS. 2 and 4, as illustrated in FIGS. 3A and 3B, reinforcing member structures 45a and 45b where edges of the lateral portion 42b of the lower housing 42 and the lateral portion 44a of the upper housing 44 of the housing 40 are bent to be folded back (folded structures) can be used. The reinforcing member structure 45a of the example illustrated in FIG. 3A and the reinforcing member structure 45b of the example illustrated in FIG. 3B are practically similar except for a difference, i.e., the former is made such that the edge of the lateral portion 44a of the upper housing 44 is bent to be folded inside, and the latter is made such that the edge of the lateral portion 44a of the upper housing 44 is bent to be folded outside. By employing such folded structures for the reinforcing members, without attaching any special reinforcing members, necessary rigidity can be obtained only by the upper housing 44 and the lower housing 42. In the reinforcing member structures 45a and 45b using the structures in which the edges of the housings are bent to be folded back, in other words, the folded structures, preferably, a curvature radius R of a bending portion is within a range of 0.3 mm<R<1 mm, and a plate thickness T of the housing is within a range of 0.5 mm<T<1.5 mm, where R is a curvature radius of the bending portion, and T is a plate thickness of the housing.

In FIGS. 3A and 3B, the sliding mechanism 48 is not shown for the purpose of simplicity. Needless to say, however, in FIGS. 3A and 3B, the sliding mechanism 48 can similarly be employed with the configuration illustrated in FIG. 4.

Figure 11A:
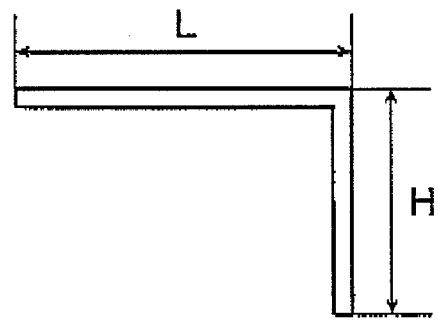
FIGS. 11A to 11C are views illustrating reinforcing member structures having different number of foldings.
Figure 11B:
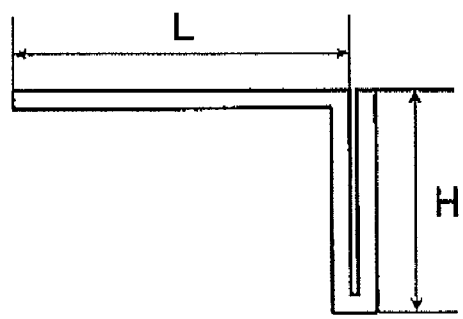
Figure 11C:
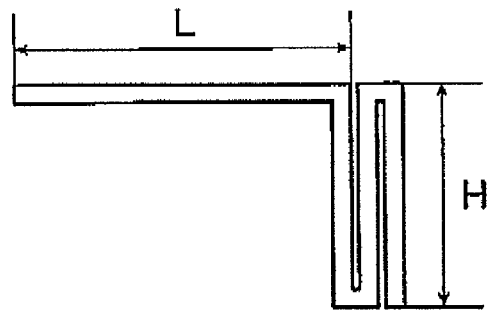

As illustrated in FIGS. 3A and 3B, to investigate strength increase effects of the reinforcing member structures 45a and 45b where the edges of the lateral portions 42b and 44a of the lower housing 42 and the upper housing 44 of the housing 40 were bent to be folded back, the inventors obtained flexural rigidity for a structure (non-folded structure: L structure) as conventionally used where the edge was bent 90° but not folded back 180° as illustrated in FIG. 11A, a structure (single-folded structure) where a portion bent 90° was further bent to be folded back 180° as illustrated in FIG. 11B, and a structure (double-folded structure) where the portion bent 90° was further bent to be folded back 180° twice as illustrated in FIG. 11C. In this case, for the structures of FIGS. 11A to 11C, the inventors obtained flexural rigidity for three types of bending heights H=10 mm, 11 mm, and 13 mm with a length L=25 mm by using a metal plate (aluminum alloy plate) of a plate thickness of 1.0 mm.

Figure 12A:
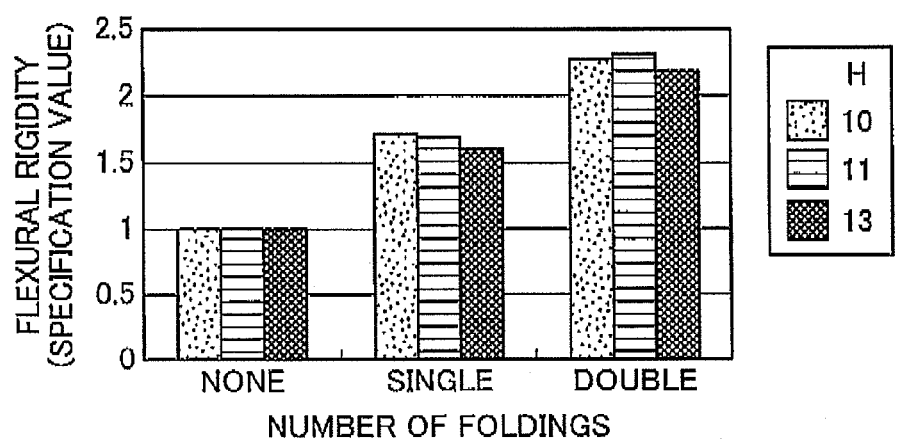
FIGS. 12A and 12B are a bar graph and a line graph of three types of bending heights, illustrating examples of relations between number of foldings and flexural rigidities.
Figure 12B:
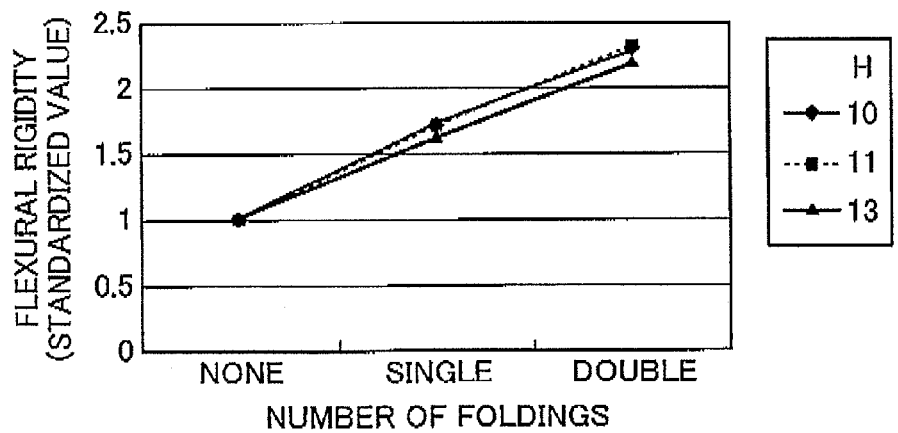

FIGS. 12A and 12B illustrate the results.

FIG. 12A is a bar graph of three types of bending heights illustrating a relationship between the number of foldings and flexural rigidity. FIG. 12B is a line graph of three types of bending heights illustrating a relationship between the number of foldings and flexural rigidity. Bending rigidity values illustrated in FIGS. 12A and 12B indicate with a value in the non-folded structure illustrated in FIG. 11A standardized to 1.

As obvious from the graphs of FIGS. 12A and 12B, with the single-folded structure, a flexural rigidity value can be increased by about 1.6 to 1.7 times as compared with the non-folded structure. With the double-folded structure, a flexural rigidity value can be increased by about 2.2 to 2.3 times as compared with the non-folded structure.

Thus, it can be understood that the reinforcing member structures 45a and 45b of the present invention, which employ folded structures, can increase the strength of the housing 40.

Figure 14A:
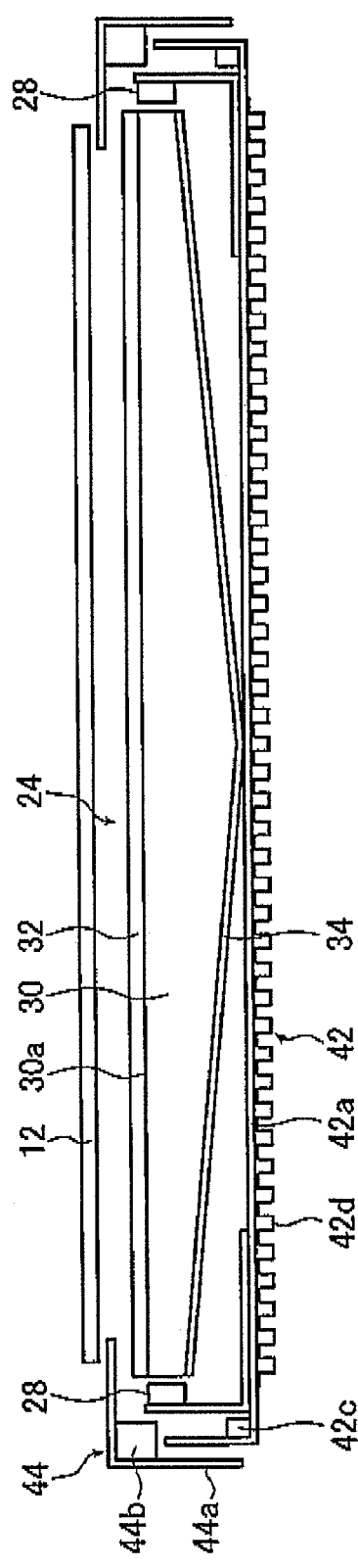
FIGS. 14A and 14B are cross sectional views respectively illustrating examples of reinforcing members employing structures where ribs are provided in housings, i.e., a structure where a rib is provided outside a bottom portion of the lower housing orthogonal to a direction (light entrance direction) perpendicular to a light entrance plane of the light guide plate, and a rib is provided in the housing, and a structure where ribs orthogonal to each other are provided inside and outside the bottom portion of the lower housing.
Figure 14B:
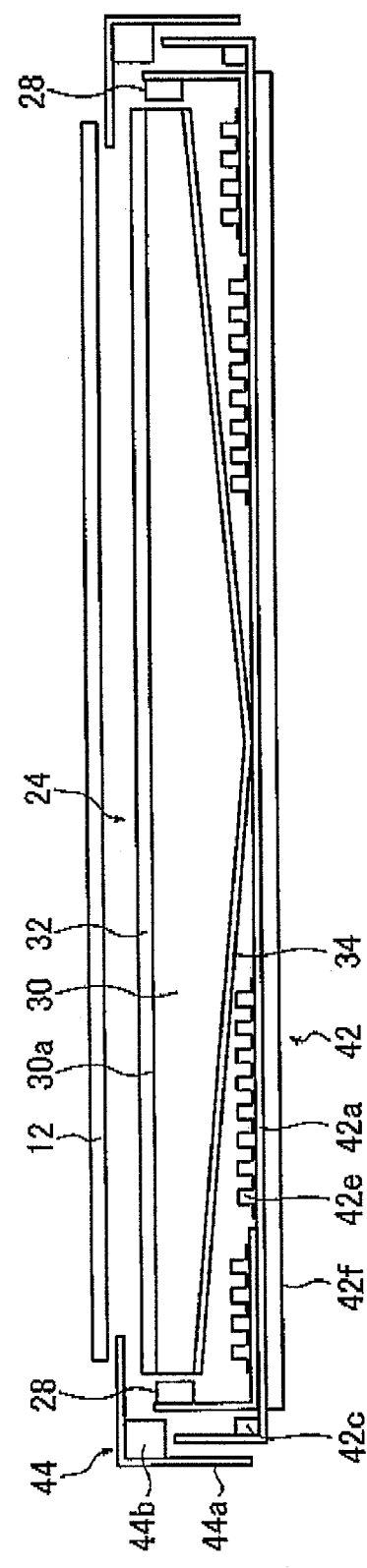
Figure 15:
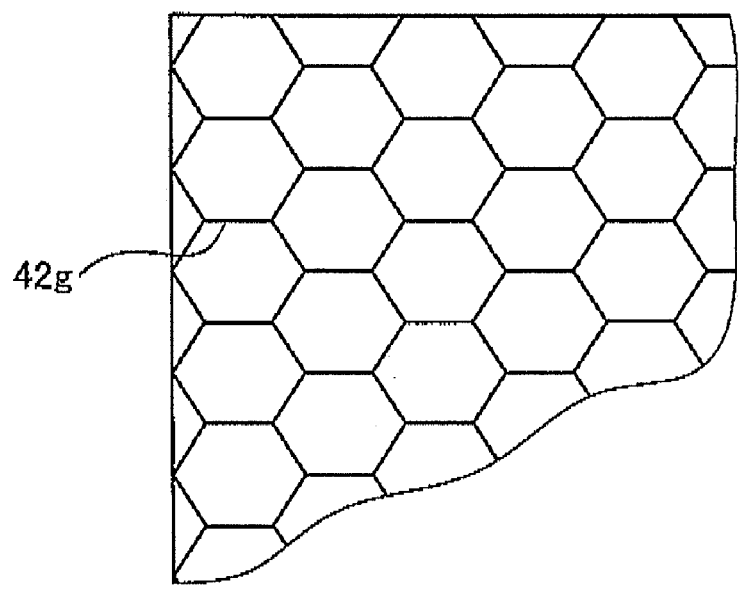
FIG. 15 is an enlarged cross sectional view illustrating an example of the honeycomb structure.

FIGS. 13A to 16 illustrate reinforcing members of other shapes. FIG. 13A is a cross sectional view illustrating an example where a block for a reinforcing member is disposed at the edge of the housing 40. FIG. 13B is a cross sectional view illustrating an example where a reinforcing member is a honeycomb structure disposed in the lower housing of the housing. FIGS. 14A and 14B are cross sectional views illustrating examples of employing structures of reinforcing members where ribs are provided in the housing 40. FIG. 14A is a cross sectional view illustrating a structure where ribs are provided outside the bottom section 42a of the lower housing 42 orthogonally to the direction (light entrance direction) perpendicular to the light entrance planes 30d and 30e of the light guide plate 30. FIG. 14B is a cross sectional view illustrating a structure where ribs orthogonal to each other are provided inside and outside the bottom section 42a of the lower housing 42. FIG. 15 is an enlarged cross sectional view illustrating the honeycomb structure used for the reinforcing member illustrated in FIG. 13B. FIG. 16 is an enlarged sectional view illustrating ribs of various shapes used for the reinforcing members illustrated in FIGS. 14A and 14B.

The reinforcing member 46 illustrated in FIG. 4 is a single bar-shaped member having a rectangular cross section and disposed between the upper housing 44 and the lower housing 42. However, as illustrated in FIG. 13A, this reinforcing member can be a block 42c disposed at the edge of the lower housing 42, or a block 44b disposed at the edge of the upper housing 44. The blocks 42c and 44c are bar-shaped members having a rectangular cross section as in the case of the reinforcing member 46 illustrated in FIG. 4, but sizes of cross-sectional shapes are smaller.

Preferably, a longer-side size A and a shorter-side size B of the block 42c or 44B are respectively within ranges of 0.2 T<A<0.5 T and 0.1 T<B<0.5 T, where A and B are sizes of the longer-side and the shorter-side of the block 42c disposed at the edge of the lower housing 42 or the block 44b disposed at the edge of the upper housing 44, and a thickness of the housing is T. These ranges are preferable because the block can be housed in the housing as in the case of ribs described below.

For the reinforcing members, as illustrated in FIGS. 14A and 14B, structures where ribs are provided in the housing 40, especially in the lower housing 42, can be employed. In the case of the structure illustrated in FIG. 14A, along a direction orthogonal to the direction (light entrance direction) perpendicular to the light entrance planes 30d and 30e of the light guide plate 30, outer ribs 42d are provided outside the bottom section 42a of the lower housing 42. In the case of the structure illustrated in FIG. 14B, inner ribs 42e and outer ribs 42f are provided to be orthogonal to each other inside and outside the bottom section 42a of the lower housing 42. Expansion/contraction of the light guide plate 30 in the direction perpendicular to the light entrance planes 30d and 30e of the light guide plate 30 is absorbed by the sliding mechanism 48. Accordingly, a force applied on the housing 40 is reduced, and normally enough in the structure illustrated in FIG. 14A. When higher rigidity is required, the structure illustrated in FIG. 14B is preferable since sufficient rigidity can be obtained.

For the ribs 42d to 42f, preferably, a relation of W<H<T is set among a rib width W, a height H, and a thickness T of the housing, and the thickness T of the housing is within a range of 5 mm<T<20 mm, where W is a width of the rib, H is a height, and T is a thickness of the housing. This range is preferable because a deflection suppressing effect is lower if the height H is not larger than the width W of the rib, and the ribs cannot be housed in the housing if the height H of the rib is not smaller than the thickness T of the housing.

Figure 16A:
FIGS. 16A to 16C are enlarged cross sectional views illustrating rib shapes.
Figure 16B:
Figure 16C:

FIGS. 16A to 16C illustrate various sectional shapes of ribs suitably employed as the ribs 42d to 42f. FIG. 16A illustrates a square rib, FIG. 16B illustrates a semicircular rib, and FIG. 16C illustrates a rectangular rib. The rib shapes illustrated here are only exemplary. Needless to say, rib shapes are not limited to these shapes, but other optional rib shapes can be employed.

For the reinforcing member, as illustrated in FIG. 13B, in place of the ribs, a honeycomb structure 42g of FIG. 15 provided in the lower housing 42 of the housing 40 can be employed. In this case, preferably, a plate thickness Th of the honeycomb structure is within a range of 0.5 mm<Th<1.5 mm, where Th is a plate thickness of the honeycomb structure provided in the lower housing 42 of the housing 40, and a size Wh of a diagonal line of the honeycomb structure is within a range of 5 mm<Wh<20 mm.

These reinforcing members can be used singly but also in combination as illustrated in FIGS. 3A and 13A to 16C. In other words, the examples of FIGS. 14A and 14B are combinations of the structure illustrated in FIG. 13A where the block is disposed at the edge of the housing with the structure illustrated in FIG. 16 where the ribs are provided in the housing 40. The example of FIG. 13B is a combination of the structure illustrated in FIG. 13A where the edge of the housing 40 is bent with the honeycomb structure illustrated in FIG. 15 and disposed in the lower housing of the housing 40.

As described above, the light guide plate 30 is held to be freely expanded/contracted in the housing 40, and the sliding mechanism 48 is disposed between the housing 40 and the fixing member 31a integrating the light guide plate 30 and the light source 28. Thus, even when the light guide plate 30 is expanded/contracted in the direction perpendicular to the light entrance planes 30d and 30e of the light guide plate 30, the fixing member 31a can slide by the sliding mechanism 48 according to the expansion/contraction of the light guide plate 30. This way, a warp of the light guide plate 30 caused by its expansion/contraction in the direction perpendicular to the light entrance plane can be suppressed, and brightness unevenness of light emitted from the light exit plane 30a of the light guide plate 30 can be suppressed. Moreover, since the light guide plate 30 can be freely expanded/contracted in the direction perpendicular to the light entrance plane of the light guide plate 30 even in the case of a large light guide plate, brightness unevenness of light emitted from the light exit plane 30a of the light guide plate 30 can be suppressed.

The light guide plate 30 and the light source 28 are secured to the fixing member 31a to keep constant the optical axis distance and the optical axis perpendicular distance therebetween. Thus, even when the fixing member 31a slides, the optical axis distance between the light guide plate 30 and the light source 28 can be kept constant. This way, pressing of the light source 28 by the light entrance planes 30d and 30e of the light guide plate 30 caused by expansion/contraction of the light guide plate 30 in the direction perpendicular to the light entrance planes to destroy the light source, and a reduction of light admission efficiency of light emitted from the light source 28 to the light guide plate 30 can be prevented.

The housing 40 includes the reinforcing member 46. Thus, deformation of the housing caused by expansion/contraction or a warp of the light guide plate 30 can be prevented.

According to the embodiment, as illustrated in FIG. 4, the sliding mechanism 48 includes the upper sliding member 48b and the lower sliding member 48c, whereby a frictional force can be generated between the upper sliding member 48b and the lower sliding member 48c and the fixing member 31a according to an expanding/contracting force of the light guide plate 30.

Contact areas of the light guide plate 30 with the upper sliding member 48b and the lower sliding member 48c of the sliding mechanism 48 are small when expansion/contraction of the light guide plate 30 is small, and large when expansion/contraction of the light guide plate 30 is large. A frictional force applied between the upper sliding member 48b and the lower sliding member 48c and the fixing member 31a is small when the contact area is small, and large when the contract area is large. Thus, a frictional force applied between the light guide plate 30 and the upper sliding member 48b and the lower sliding member 48c of the sliding mechanism 48 is small when expansion/contraction of the light guide plate 30 is small, and large when expansion/contraction of the light guide plate 30 is large.

Thus, by shaping the upper sliding member 48b and the lower sliding member 48c of the sliding mechanism 48 as shown in FIG. 4, a frictional force corresponding to an expanding/contracting force of the light guide plate 30 can be generated between the upper sliding member 48b and the lower sliding member 48c of the sliding mechanism 48 and the fixing member 31a to serve as a resistance to expansion of the light guide plate 30.

Figure 17:
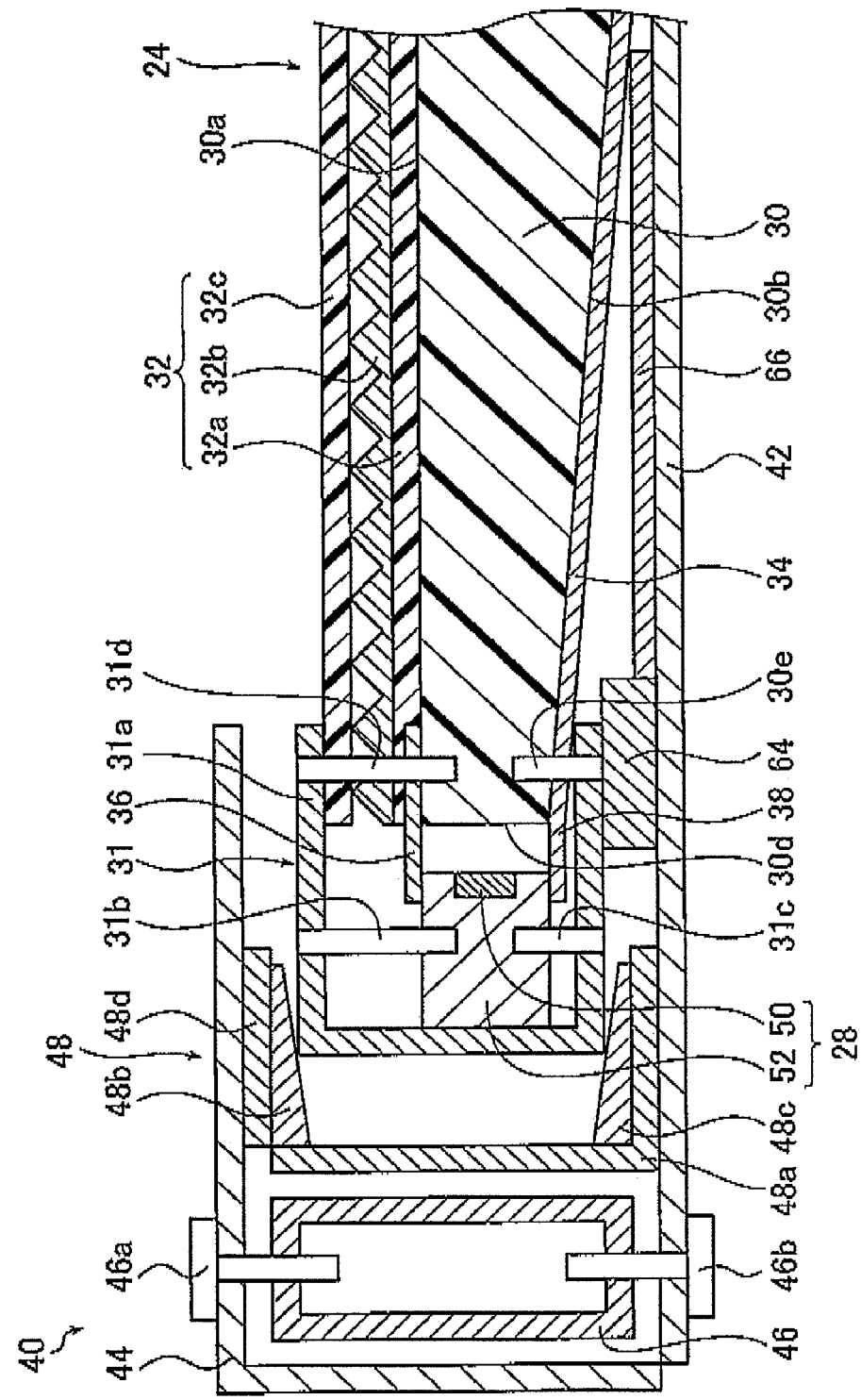
FIG. 17 is a partially enlarged cross sectional view of the vicinity of a light source and a light entrance plane of a light guide plate of a planar lighting device according to another embodiment of the present invention.

According to the embodiment, the frictional force corresponding to the expanding/contracting force of the light guide plate 30 is generated by using the plate-shaped upper sliding member 48b and the plate-shaped lower sliding member 48c of the shapes shown in FIG. 4. However, the upper sliding member 48b and the lower sliding member 48c are not limited to these shapes. For example, as exaggeratedly illustrated in FIG. 17, the upper sliding member 48b and the lower sliding member 48c may be formed into shapes where sections thereof grow narrower toward the ends thereof. As a matter of course, the actual angle is so small that the fixing member 31a can be just inserted.

As illustrated in FIG. 15, in the case of the shapes of the upper sliding member 48b and the lower sliding member 48c where the sections thereof are narrower toward the ends thereof, when expansion of the light guide plate 30 is small, a width between the upper sliding member 48b and the lower sliding member 48c is large, and thus a frictional force applied between the upper sliding member 48b and the lower sliding member 48c and the fixing member 31a is small. When expansion of the light guide plate 30 is large, the fixing member 31a must slide through a narrow width between the upper sliding member 48b and the lower sliding member 48c, and thus a frictional force applied between the upper sliding member 48b and the lower sliding member 48c and the fixing means 31 is large. In other words, even when the upper sliding member 48b and the lower sliding member 48c are formed into shapes where the sections thereof are narrower toward the ends thereof, a frictional force corresponding to an expanding/contracting force of the light guide plate 30 can be generated between the upper sliding member 48b and the lower sliding member 48c and the fixing member 31a. According to the embodiment illustrated in FIG. 17, the upper sliding member 48b and the lower sliding member 48c of the shapes where the sections thereof are narrower toward the ends apply pressing forces on the fixing member 31a, and thus the sliding mechanism 48 need not include a spring material 47 unlike the case of the sliding mechanism 48 illustrated in FIG. 4.

In the illustrated example, various materials such as Teflon and metal can be used for the upper sliding member 48b and the lower sliding member 48c. Without separately installing the upper sliding member 48b and the lower sliding member 48c, oil may be applied on the lower and upper housings 42 and 44 to constitute the upper sliding member 48b and the lower sliding member 48c.

According to the embodiment, the upper sliding member 48b and the lower sliding member 48c are respectively disposed in the underside of the upper housing 44 and in the top surface of the lower housing 42. However, the present invention is not limited to this arrangement. For example, a structure where only the upper sliding member 48b or only the lower sliding member 48c is disposed may be employed. In this way, the structure of the housing 40 can be simplified.

The lower housing 42, the upper housing 44, and the reinforcing member 46 are connected together by the screws 46a and 46b. The stress applied when screwing the screws 46a and 46b determines the stress for holding the fixing means 31 (fixing member 31a) between the upper sliding member 48b and the lower sliding member 48c. Such screw fastening stress may be used to control the frictional force generated between the fixing member 31a and the upper sliding member 48b and the lower sliding member 48c.

In this case, when a frictional force between the fixing member 31a and the upper sliding member 48b and the lower sliding member 48c is larger than an expanding/contracting force of the light guide plate 30, the fixing member 31a cannot slide in the upper or lower sliding member 48b or 48c. Consequently, a warp of the light guide plate 30 generated when the light guide plate 30 is expanded/contracted cannot be suppressed.

Stress applied by the screws 46a and 46b on the upper sliding member 48b and the lower sliding member 48c varies from place to place because of a stress distribution even if pressing forces of the screws 46a and 46b are constant.

Thus, the positions of the upper sliding member 48b and the lower sliding member 48c are preferably determined according to magnitude of stress applied by the screws 46a and 46b and a stress distribution. A method of determining the positions of the upper sliding member 48b and the lower sliding member 48c will be described in detail.

A pushing force F by expansion/contraction of the light guide plate 30 is represented by the following equation, where Y is Young's modulus of the light guide plate 30, L is a length, ΔL is expansion, an Aave is an average sectional area:

$$F = Y \cdot Aave \cdot (\Delta L/L)$$

A condition for starting sliding of the fixing member 31a which fixes the light guide plate 30 in the upper sliding member 48b and the lower sliding member 48c is represented as follows, where G is a pressing force of the light guide plate 30 concentrated at the ends of the upper sliding member 48b and the lower sliding member 48c, and μ is a coefficient of static friction of a contact surface:

$$F > \mu \cdot G$$

An example of a force F by expansion/contraction of the light guide plate 30 in an actual shape will be described. When an acrylic material is used for the light guide plate 30, and Teflon is used for the upper sliding member 48b and the lower sliding member 48c, Young's modulus of the light guide plate 30 is 1.5 to 3 MPa=1.5 to 3 MN/m$^2$, and a coefficient of static friction of the upper sliding member 48b and the lower sliding member 48c is 0.01. In this case, a value of the coefficient of static friction is a value when the upper sliding member 48b and the lower sliding member 48c of the fixing member 31a are disposed. A volumetric expansion rate of the light guide plate 30 is set to 0.3% per 24 hours. When a light guide plate where a width in a direction perpendicular to the light exit plane 30a of the entrance portion of the light guide plate 30 is 2 mm, and a width in a direction perpendicular to the light exit plane 30a in the bisector α of the light guide plate 30 is 3.6 mm is used, a size of the light guide plate, an average sectional area Aave, and a force F by expansion/contraction of the light guide plate 30 are as illustrated in Table 2.

TABLE 2

|  | Aave [m$^2$] | F [kgw] |
| --- | --- | --- |
| 42 inches | 0.0028 | 2.57 |
| 46 inches | 0.0031 | 2.85 |
| 52 inches | 0.0035 | 3.21 |
| 57 inches | 0.0038 | 3.49 |
| 65 inches | 0.0043 | 3.99 |

Next, a condition for starting sliding of the fixing member 31a in the upper sliding member 48b and the lower sliding member 48c with a stress distribution taken into consideration will be described.

The screws 46a and 46b are screws of M3. When the fixing member 31a is fastened, its fastening force is about 60 kg. This is a force directly applied on a screw thread, and the force is distributed near the screws by washers. In reality, fastening forces of the screws 46a and 46b are not directly applied on an object to be pressed, but pressure accompanied by a distribution may be applied on a very small area to provide perpendicular resistance. When a stress distribution is G(x) one-dimensionally, a position of x=0 may correspond to an approximate screw fastening force. A frictional force T(x) in a position spaced by a distance x from the screws 46a and 46b is represented as follows;

$$T(x)=\mu \cdot G(x)$$

A condition that enables sliding of the fixing member 31a fixing the light guide plate 30 and the light source 28 in the upper sliding member 48b and the lower sliding member 48c is represented as follows:

$$T(x)=\mu \cdot G(x) < F = Y \cdot Aave \cdot (\Delta L/L) \quad (5)$$

Figure 18:
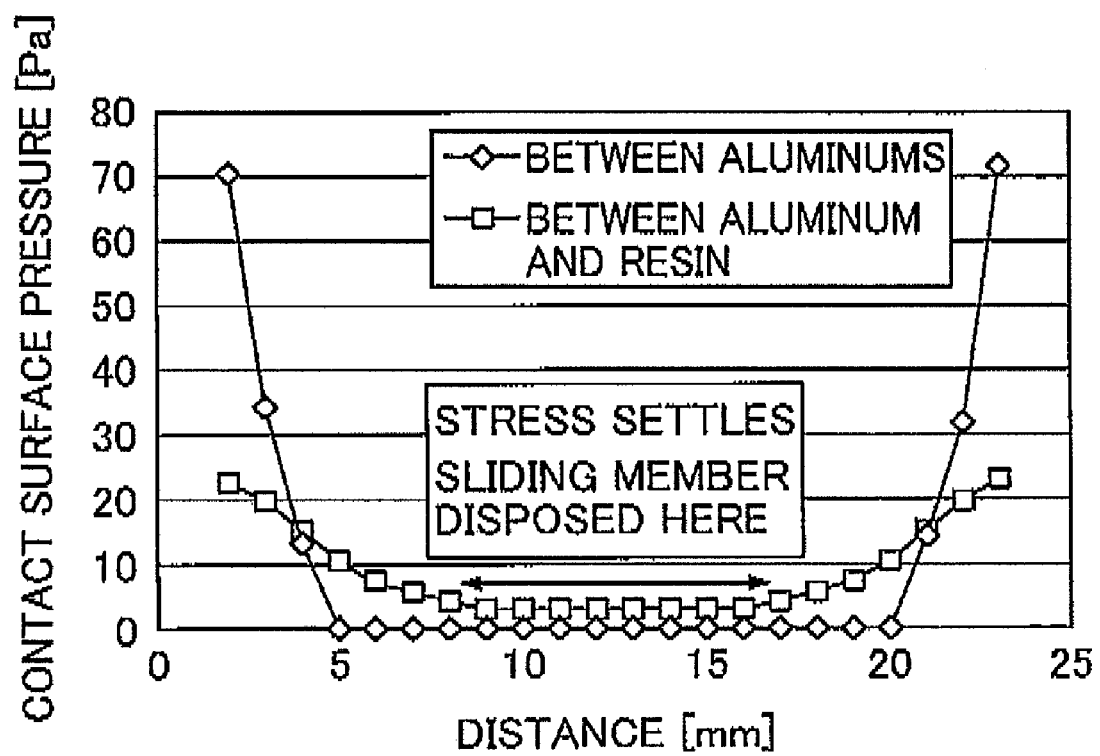
FIG. 18 is a graph illustrating measurements of stress distributions from a screwing position.

FIG. 18 illustrates measurement results of stress distributions in the case of screwing in positions of x=0 and x=25. An ordinate indicates magnitude of stress, while an abscissa indicates a distance from a screwing position. Two solid lines indicate a case where materials of the fixing member 31a and the upper sliding member 48b and the lower sliding member 48c are both aluminum, and a case where a material for one member is aluminum while a material for another member is a resin. As illustrated in FIG. 18, in the stress distribution G(x), stress declines from the screwing position, settles in the center, and increases again toward another screwing position. The sliding mechanism 48 is disposed at a location where the stress settles. This way, since the upper sliding member 48b and the lower sliding member 48c are disposed in places of small stress, an expanding/contracting force of the light guide plate 30 and a frictional force applied between the fixing member 31a and the sliding mechanism 48 easily satisfy the equation (5). Since the stress remains constant in the range where it settles, positioning of the upper sliding member 48b and the lower sliding member 48c is facilitated. Thus, the fixing member 31a can be slid more surely by the sliding mechanism 48.

As described above, by taking the expanding/contracting force of the light guide plate, the fastening stress of the screws 46a and 46b, and the stress distribution into consideration, positions of the upper sliding member 48b and the lower sliding member 48c of the sliding mechanism 48 are determined. Thus, according to the expanding/contracting force of the light guide plate 30, the fixing member 31a can surely slide on the upper sliding member 48b and the lower sliding member 48c by the sliding mechanism 48.

The planar lighting device 10 of the embodiment further includes the heat sink 64 connected to the bottom portion of the sliding member fixing member 48a to absorb heat of the light source 28, and the heat pipe 66 disposed between the reflection plate 34 and the lower housing 42 and connected to the heat sink 64 to radiate heat.

The heat sink 64 absorbs heat radiated from the light source 28 through the sliding member fixing member 48a to radiate heat or conduct heat to the heat pipe 66.

The heat pipe 66 radiates the heat conducted from the heat sink 64 connected to one end of the heat pipe 66 from another end thereof.

By disposing the heat sink 64 and the heat pipe 66, the heat generated from the light source 28 can be efficiently moved to the heat pipe 66 to be radiated therefrom. Thus, since the light source is cooled even when light emission efficiency of the light source is low, the amount of light emitted from the light source can be increased, thereby realizing a large backlight unit. Cooling of the light source can further increase the amount of light emitted from the light source, thereby realizing a large backlight unit.

The heat sink is not limited to the air-cooling method. A water-cooling method can also be used.

The power unit casing 49 (see FIG. 1) for holding a power source (not shown) of the light source is attached to the underside of the lower housing 42.

The planar lighting device 20 is basically configured as described above.

In the planar lighting device 20, light emitted by the light sources 28 provided on both sides of the light guide plate 30 strikes the light entrance planes, i.e., the first light entrance plane 30d and the second light entrance plane 30e, of the light guide plate 30 while light emitted by the auxiliary light sources 29 provided on the other two sides of the light guide plate 30 strikes the lateral planes, i.e., the first lateral plane 30f and the second lateral plane 30g. Then, the light admitted through the respective planes is scattered by scatterers contained inside the light guide plate 30 as the light travels through the inside of the light guide plate 30 and, directly or after being reflected by the first inclined plane 30b or the second inclined plane 30c, exits through the light exit plane 30a. In the process, part of the light leaking through the first inclined plane 30b and the second inclined plane 30c is reflected by the reflection plate 34 to enter the light guide plate 30 again.

Thus, light emitted through the light exit plane 30a of the light guide plate 30 is transmitted through the optical member 32 and emitted through the light exit plane 24a of the main body of the lighting device 24 to illuminate the liquid crystal display panel 12.

The liquid crystal display panel 12 uses the drive unit 14 to control the transmittance of the light according to the position so as to display characters, figures, images, etc., on its surface.

The light guide plate 30 may have any shape without limitation to the above shape, provided that the thickness of the light guide plate 30 increases with the increasing distance from the light entrance planes 30d and 30e.

For example, prism arrays may be formed on the first inclined plane 30b and the second inclined plane 30c in the direction parallel to the first light entrance plane 30d and the second light entrance plane 30e. Instead of such prism arrays, optical elements similar to prisms may be provided and arranged regularly. For example, elements having lens effects such as lenticular lenses, concave lenses, convex lenses, or optical elements in pyramidal shape may be formed on the inclined planes of the light guide plate.

In the embodiment under discussion, the light exit plane 30a of the light guide plate 30 has the longer sides adjacent the light entrance planes 30d and 30e and the shorter sides adjacent the lateral planes 30f and 30g in order to emit light through the light exit plane 30a with an enhanced brightness and efficiency. The present invention, however, is not limited to such a configuration; the light exit plane may be formed into a square; or the sides thereof adjacent the light entrance planes may be the shorter sides and the sides thereof adjacent the lateral planes may be the longer sides.

For the light guide plane 30, preferably, the ridge 30h, a joint between the first inclined plane 30b and the second inclined plane 30c, has a rounded shape. By forming the ridge 30h into a rounded shape, and smoothly interconnecting the first inclined plane 30b and the second inclined plane 30c, brightness unevenness of a bright line in the intersection (ridge h) between the first inclined plane 30b and the second inclined plane 30c can be prevented.

While, in the embodiment under discussion, the inclined planes 30b and 30c of the light guide plate 30 are defined by a straight line in cross section, the shape of the first inclined plane 30b and the second inclined plane 30c, i.e., the underside of the light guide plate, is not limited specifically. The inclined planes 30b and 30c may be defined by a curved surface or each of them may have two or more inclined planes combined. In other words, each inclined plane may have inclined planes each having different inclination angles according to their position. Further, the inclined planes may be curved outwardly or inwardly with respect to the light exit plane 30a, or may have outwardly and inwardly curved planes combined.

The inclined planes preferably have a configuration such that their inclination angle with respect to the light exit plane 30a decreases from the light entrance planes 30d and 30e toward the center of the light guide plate 30 or toward a position where the light guide plate is thickest. Where the inclination angle of the inclined planes gradually decreases, light having less brightness unevenness can be emitted through the light exit plane 30a.

The inclined planes more preferably have an aspherical cross section that may be expressed by a 10-th order polynomial. Where the inclined planes have such a configuration, light having less brightness unevenness can be emitted regardless of the thickness of the light guide plate.

Further, the shape of the light guide plate 30 is not limited to that of the embodiment under discussion; for example, the first inclined plane 30b and the second inclined plane 30c may have different inclinations from each other. Still further, the light guide plate may have a shape such that the distance between the first light entrance plane 30d and the position where the light guide plate is thickest is different from the distance between the second light entrance plane 30e and the position where the light guide plate is thickest. Described otherwise, the length of the first inclined plane in the direction of the optical axis is different from that of the second inclined plane in the direction of the optical axis.

The light guide plate having such a shape is also capable of allowing light to travel a long distance from the light entrance planes, while keeping a thin design. This enables a reduced thickness of the light guide plate and a larger light exit plane to be achieved.

Again, with the light guide plate having the above shape, preferably the value $\Phi \cdot N_p \cdot L_G \cdot K_c$ is in the range of not less than 1.1 and not greater than 8.2, and $0.005 \leq K_c \leq 0.1$, where $L_G$ is the length in the incident direction from the light entrance plane to the position where the thickness of the light guide plate in the direction perpendicular to the light exit plane is thickest. When the above ranges are satisfied, light can be emitted through the light exit plane with a reduced illuminance unevenness and a high light use efficiency.

The light guide plate may be fabricated by mixing a plasticizer into the transparent resin described above.

Fabricating the light guide plate from a material thus prepared by mixing a transparent material and a plasticizer provides a flexible light guide plate, allowing the light guide plate to be deformed into various shapes. Accordingly, the surface of the light guide plate can be formed into various curved surfaces.

Where the light guide plate is given such flexibility, the light guide plate or the planar lighting device using the light guide plate can even be mounted to a wall having a curvature when used, for example, for a display board employing ornamental lighting (illuminations). Accordingly, the light guide plate can be used for a wider variety of applications and in a wider application range including ornamental lighting and point-of-purchase (POP) advertising.

The plasticizer is exemplified by phthalic acid esters, or, specifically, dimethyl phthalate, diethyl phthalate (DEP), dibutyl phthalate (DBP), di(2-ethylhexyl)phthalate (DOP (DEHP)), di-n-octyl phthalate (DnOP), diisononyl phthalate (DINP), dinonyl phthalate (DNP), diisodecyl phthalate (DIDP), phthalate mixed-base ester ($C_6$ to $C_{11}$) (610P, 711P, etc.) and butyl benzyl phthalate (BBP). Besides phthalic acid esters, the plasticizer is also exemplified by dioctyl adipate (DOA), diisononyl adipate (DINA), dinormal alkyl adipate ($C_{6,8,10}$) (610A), dialkyl adipate ($C_{7,9}$) (79A), dioctyl azelate (DOZ), dibutyl sebacate (DBS), dioctyl sebacate (DOS), tricresyl phosphate (TCP), tributyl acetylcitrate (ATBC), epoxidized soybean oil (ESBO), trioctyl trimellitate (TOTM), polyesters, and chlorinated paraffins.

While the inventive planar lighting device has been described above in detail, the present invention is not limited in any manner to the above embodiment and various improvements and modifications may be made without departing from the spirit of the present invention.

For example, according to the embodiment, the two fixing means 31 (fixing members 31a) provided on the first light entrance plane 30d side and the second light entrance plane 30e side of the light guide plate 30 can slide by the sliding mechanism 48 installed in the housing 40. However, the fixing means 31 on one side and the sliding mechanism 48 may be integrated as a fixed end, and fixed to the housing 40. This way, positioning of the light guide plate 30 with respect to the housing 40 can be facilitated.

Figure 19:
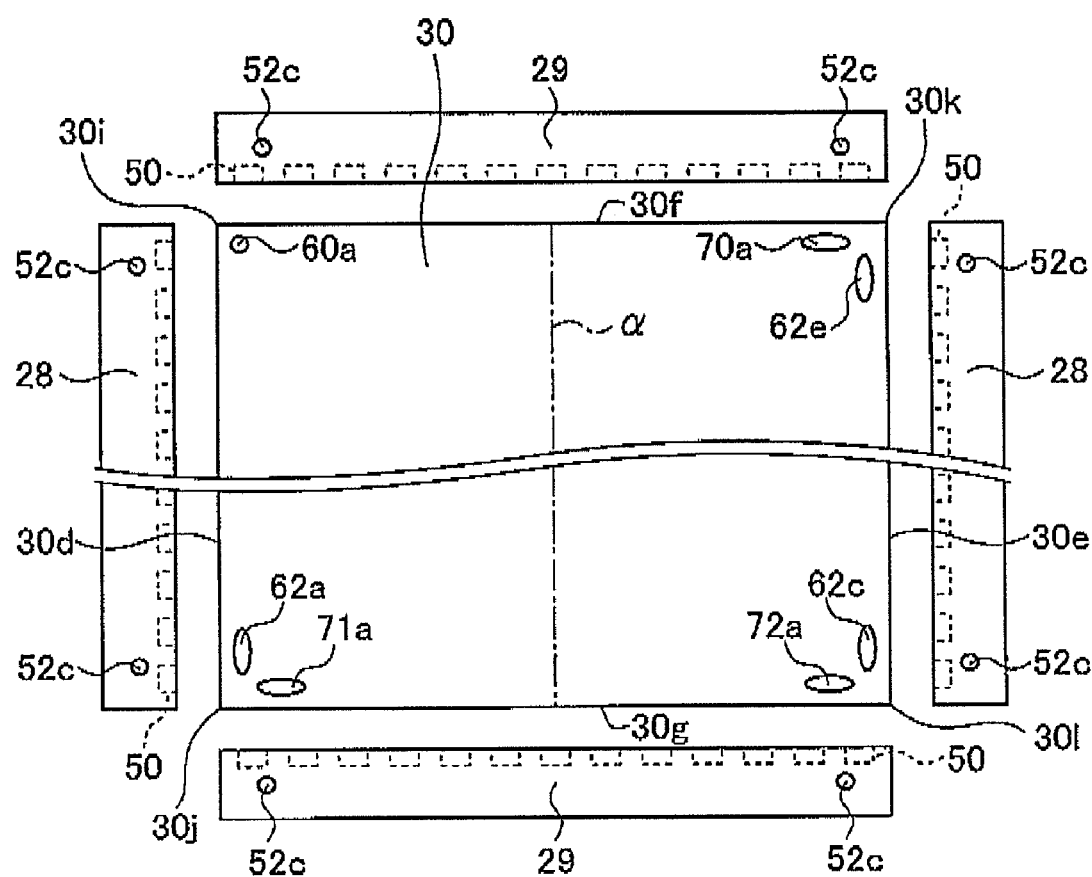
FIG. 19 is a schematic plan view illustrating another embodiment of shapes of a light guide plate and a light source used for the planar lighting device of the present invention.

According to the embodiment, the light sources 28 are disposed only opposite the light entrance planes 30d and 30e. However, this arrangement is in no way limitative of the present invention. As illustrated in FIG. 19, a light source 28 disposed opposite the light entrance planes 30d and 30e may be set as a main light source, an auxiliary light source 29 may be disposed opposite the first lateral plane 30g and the second lateral plane 30f, and the first lateral plane 30g and the second lateral plane 30f may be set respectively as a third light entrance plane and a fourth light entrance plane. This way, brightness of light emitted from the light exit plane can be further enhanced.

When the auxiliary light source 29 is disposed, fixing means 31 and a sliding mechanism 48 are disposed as in the case of the light source 28 illustrated in FIG. 2, and screw holes 52c and 52d are made in a light source mount 52 as illustrated in FIG. 19. To keep constant a distance between the light source 28 and the light entrance planes 30d and 30e of the light guide plate 30 and a distance between the auxiliary light source 29 and the light entrance planes 30f and 30g of the light guide plate 30, a first circular hole 60a, a first long hole 62a, and a second long hole 62c are made in the corners 30i, 30j, and 30l of the light exit plane 30a of the light guide plate 30, and a fifth long hole 62e substantially similar in shape to the first long hole 62a and the second long hole 62c is made in place of the second circular hole 60c made in the corner 30k of the light guide plate 30. In addition, a sixth long hole 70a, a seventh long hole 71a, and an eighth long hole 72a having long diameters in a direction orthogonal to long diameters of the first long hole 62a, the second long hole 62c, and the fifth long hole 62e are respectively made in the corners 30k, 30j, and 30l of the light guide plate 30. Thus, destruction of the main light source 28 and the auxiliary light source 29 caused by expansion/contraction of the light guide plate 30, a reduction of light admission efficiency to the lateral planes by the main light source 28 and the auxiliary light source 29, brightness unevenness of light emitted from the light exit plane 30a can be simultaneously prevented. While not shown, in the inclined planes 30b and 30c of the rear plane of the light guide plate 30, circular holes and long holes are similarly formed in positions corresponding to the circular holes and the long holes of the light exit plane 30a of the light guide plate 30.

In the example illustrated in FIG. 19, though not shown, to connect the light guide plate 30 to the upper housing 44 and the lower housing 42 of the housing 40, as in the case of the examples illustrated in FIGS. 5A and 7, a third circular hole 61a, a third long hole 63a, and a fourth long hole 63b may be made in the light guide plate 30. The third circular hole 61a, the third long hole 63a, the fourth long hole 63b illustrated in FIGS. 5A and 7 are through-holes. However, these holes may be separated in the light exit plane 30a and the rear plane of the light guide plate 30.

One circular hole 60a, six long holes 62a, 62c, 62e, 70a, 71a, and 72a, and one circular hole and six long holes of the rear plane thereof corresponding to the one circular hole and the six long holes are circular holes and long holes for securing the light guide plate 30 to the fixing member 31a to integrate it with the light source 28 and the auxiliary light source 29, and keeping constant a distance between the light source 28 and the light entrance planes 30d and 30e of the light guide plate 30, and a distance between the auxiliary light source 29 and the light entrance planes obtained by substituting the lateral planes 30f and 30g of the light guide plate 30. Thus, as long as these functions are present, the circular holes and the long holes of the light exit plane 30a and the circular holes and the long holes of the rear plane may be through-holes.

Further, for example, while each LED chip of the light sources is formed by applying YAG fluorescent substance to the light emission face of a blue LED, the LED chip may be formed otherwise without limitations to such a configuration. For example, the LED chip used herein may be formed using a different monochromatic LED such as a red LED or a green LED with a fluorescent substance.

Further, an LED unit formed using three kinds of LEDs, i.e., a red LED, a green LED, and a blue LED, may be used. In that case, light beams emitted by the three kinds of LEDs are blended to produce white light.

Alternatively, a semiconductor laser (LD) may be used instead of an LED.

Further, one may provide between the light guide plate 30 and each of the light sources (light sources 28 and/or auxiliary light sources 29) a portion formed of a material having a refractive index close to that of the light guide plate 30. Alternatively, part of the light entrance planes and/or the lateral planes of the light guide plate may be formed of a material having a smaller refractive index than the other parts.

Where the part through which light emitted by the light source is admitted is adapted to have a smaller refractive index than the other parts, light emitted by the light source can be admitted more efficiently, and the light use efficiency can be further enhanced.

Further, two or more light guide plates may be juxtaposed by connecting their lateral planes to provide a single light exit plane formed by a plurality of light guide plates. In that case, the auxiliary light sources may be provided only on the lateral planes of the outermost light guide plates.

What is claimed is:
1. A planar lighting device comprising:
a light source for emitting light;
a light guide plate disposed adjacent to the light source and including a light entrance plane for admitting the light emitted by the light source and a light exit plane for emitting the light admitted from the light entrance plane as planar light;
a support member for supporting the light source and the light guide plate while keeping constant a distance between the light source and the light entrance plane of the light guide plate;
a housing for housing the light source and the light guide plate supported by the support member;
a sliding mechanism disposed between the housing and the support member for elastically sliding the support member with respect to the housing in a direction from the light entrance plane of the light guide plate to the light source according to expansion/contraction of the light guide plate while keeping constant the distance between the light source and the light entrance plane of the light guide plate; and
a reinforcing member for reinforcing the housing according to the expansion/contraction of the light guide plate.

2. The planar lighting device according to claim 1, wherein the support member supports the light guide plate to be slidable with respect to the support member in a direction orthogonal to the direction from the light entrance plane of the light guide plate to the light source according to the expansion/contraction of the light guide plate.

3. The planar lighting device according to claim 1, wherein the sliding mechanism changes a frictional force between the sliding mechanism and the support member according to the expansion/contraction of the light guide plate.

4. The planar lighting device according to claim 1, wherein the light guide plate comprises the light exit plane that is rectangular and flat, a pair of the opposite light entrance planes formed along a pair of opposite sides of the light exit plane to admit light travelling parallel to the light exit plane, and a rear plane having a pair of inclined planes formed on the side opposite from the light exit plane and inclined such that the thickness of the light guide plate in the direction perpendicular to the light exit plane grows thicker with an increasing distance from each of the pair of light entrance planes and joining each other in a middle between the pair of light entrance planes, wherein the light source includes a pair of light sources disposed opposite the pair of light entrance planes of the light guide plate to emit light to each of the pair of light entrance planes, wherein each of the pair of light sources has a plurality of LED chips and a support for supporting the plurality of LED chips, and wherein the plurality of LED chips are arrayed on a plane of the support facing each of the pair of light entrance planes in the longitudinal direction of each of the pair of light entrance planes.

5. The planar lighting device according to claim 4, further comprising a pair of remaining light entrance planes formed on a pair of remaining opposite sides of the light exit plane of the light guide plate to be orthogonal to the pair of light entrance planes and a pair of the light sources disposed opposite each of the pair of remaining light entrance planes to emit light to each of the pair of remaining light entrance planes.

6. The planar lighting device according to claim 1, wherein the light guide plate comprises numerous scattering particles therein, and satisfies the following inequalities:

$$1.1 \leq \Phi \cdot N_p \cdot L_G \cdot K_c \leq 8.2$$

$$0.005 \leq K_c \leq 0.1$$

where $\Phi$ is a scattering sectional area of the scattering particles, $N_p$ is a density of the scattering particles, $K_c$ is a correction coefficient, and $L_G$ is a length from the light entrance plane of the light guide plate to a position where a thickness of the light guide plate is largest in a light entrance direction.

7. The planar lighting device according to claim 1, wherein the reinforcing member has a structure where an edge of the housing is bent to be folded back.

8. The planar lighting device according to claim 7, wherein a bending curvature radius R in the structure where the edge of the housing is bent to be folded back is within a range of 0.3 mm<R<1 mm, and a plate thickness T of the housing is within a range of 0.5 mm<T<1.5 mm.

9. The planar lighting device according to claim 1, wherein the reinforcing member has a structure where a rib is provided in the housing.

10. The planar lighting device according to claim 9, wherein a relation among a width W and a height H of the rib and a thickness T of the housing in the structure where the rib is provided in the housing is W<H<T, and the thickness T of the housing is within a range of 5 mm<T<20 mm.

11. The planar lighting device according to claim 1, wherein the reinforcing member has a structure where a block is disposed at the edge of the housing.

12. The planar lighting device according to claim 11, wherein a longer-side size A and a shorter-side size B of the block and the thickness T of the housing in the structure where the block is disposed at the edge of the housing are respectively within ranges of 0.2 T <A<0.5 T and 0.2 T<B<0.5 T.

13. The planar lighting device according to claim 1, wherein the reinforcing member has a honeycomb structure disposed in a lower housing of the housing.

14. The planar lighting device according to claim 13, wherein a plate thickness Th of the honeycomb structure disposed in the lower housing of the housing is within a range of 0.5 mm<Th<1.5 mm, and a size of a diagonal line Wh of the honeycomb structure is within range of 5 mm<Wh<20 mm.

* * * * *